US008414299B2

(12) United States Patent
Ichimi et al.

(10) Patent No.: US 8,414,299 B2
(45) Date of Patent: Apr. 9, 2013

(54) VEHICLE SIMULATION SYSTEM

(75) Inventors: Sadanao Ichimi, Wako (JP); Yukio Miyamaru, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 12/580,041

(22) Filed: Oct. 15, 2009

(65) Prior Publication Data

US 2010/0035218 A1 Feb. 11, 2010

Related U.S. Application Data

(62) Division of application No. 11/441,142, filed on May 26, 2006, now Pat. No. 8,033,830.

(30) Foreign Application Priority Data

May 30, 2005 (JP) ................................. 2005-157416
May 30, 2005 (JP) ................................. 2005-157765

(51) Int. Cl.
*G09B 9/02* (2006.01)
(52) U.S. Cl. ..................... 434/29; 359/439; 359/485.07; 359/838; 359/841; 359/846; 359/849; 359/850; 359/866; 359/872; 434/30; 434/61; 434/62; 434/66; 434/305; 482/57; 482/63; 482/64
(58) Field of Classification Search .............. 434/29–30, 434/57, 61–64, 66, 305; 359/439, 485.07, 359/838, 841, 846, 849, 850, 866, 872; 482/57, 482/63, 64
See application file for complete search history.

(56) References Cited

U.S. PATENT DOCUMENTS

| 3,590,265 | A | | 6/1971 | Richardson |
| 3,795,990 | A | | 3/1974 | Quicker, Jr. |
| 3,833,759 | A | * | 9/1974 | Yatabe et al. .................... 434/69 |
| 3,895,861 | A | * | 7/1975 | Herndon .......................... 352/69 |
| 4,383,740 | A | * | 5/1983 | Bordovsky ..................... 359/631 |
| 4,512,567 | A | | 4/1985 | Phillips |
| 4,692,004 | A | | 9/1987 | Wainscott et al. |
| 4,709,917 | A | | 12/1987 | Yang |
| 4,817,948 | A | * | 4/1989 | Simonelli ......................... 463/6 |
| 4,932,913 | A | | 6/1990 | Raviv et al. |

(Continued)

FOREIGN PATENT DOCUMENTS

| DE | 3409824 A | 9/1985 |
| DE | 3925427 A | 2/1991 |

(Continued)

*Primary Examiner* — Jack Yip
(74) *Attorney, Agent, or Firm* — Birch, Stewart, Kolasch & Birch, LLP

(57) ABSTRACT

A vehicle simulation system equipped to display information on the rear side of a driver (rider). The simulation system includes a dummy bicycle operated by the rider, a monitor on the front side for displaying a scene based on the operations of the dummy bicycle, and a lamp unit connected to the dummy bicycle and provided on the rear side relative to the seated position of the rider. The lamp unit has a red lamp, a yellow lamp and a green lamp, and is controlledly turned ON under the action of a main control unit. An input device is provided on a steering handle of the dummy bicycle. The input device has a switch for red, a switch for yellow, and a switch for green. The rider checks behind, and operates the input device according to the ON/OFF conditions of the lamp unit.

7 Claims, 20 Drawing Sheets

U.S. PATENT DOCUMENTS

| | | | |
|---|---|---|---|
| 5,006,072 A * | 4/1991 | Letovsky et al. | 434/61 |
| 5,184,956 A * | 2/1993 | Langlais et al. | 434/69 |
| 5,240,417 A | 8/1993 | Smithson et al. | |
| 5,392,158 A * | 2/1995 | Tosaki | 359/633 |
| 5,415,550 A | 5/1995 | Aoki et al. | |
| 5,547,382 A | 8/1996 | Yamasaki et al. | |
| 5,712,649 A * | 1/1998 | Tosaki | 345/8 |
| 5,865,624 A | 2/1999 | Hayashigawa | |
| 5,961,195 A * | 10/1999 | Yoshimatsu et al. | 353/98 |
| 6,118,388 A | 9/2000 | Morrison | |
| 6,152,856 A | 11/2000 | Studor et al. | |
| 6,712,737 B1 | 3/2004 | Nusbaum | |
| 6,735,015 B1 * | 5/2004 | Blackham | 359/451 |
| 6,803,884 B1 | 10/2004 | Ohzawa et al. | |
| 6,918,860 B1 | 7/2005 | Nusbaum | |
| 2002/0055422 A1 | 5/2002 | Airmet et al. | |
| 2002/0109993 A1 * | 8/2002 | Jung et al. | 362/318 |
| 2002/0190923 A1 * | 12/2002 | Ronzani et al. | 345/50 |
| 2003/0134714 A1 | 7/2003 | Oishi et al. | |
| 2004/0072657 A1 | 4/2004 | Arguilez | |
| 2006/0229163 A1 | 10/2006 | Waters | |
| 2007/0019311 A1 * | 1/2007 | Stricek | 359/864 |
| 2007/0048690 A1 * | 3/2007 | Stricek et al. | 434/29 |
| 2008/0206720 A1 * | 8/2008 | Nelson | 434/44 |

FOREIGN PATENT DOCUMENTS

| | | |
|---|---|---|
| DE | 44 38 411 A1 | 5/1996 |
| EP | 0 564 368 A1 | 10/1993 |
| EP | 0709815 A1 | 1/1996 |
| JP | 2000-258723 A | 9/2000 |
| JP | 2001-340649 A | 12/2001 |
| JP | 2005-3923 A | 1/2003 |
| JP | 2005003923 A | 1/2005 |
| JP | 2005195839 A | 7/2005 |
| WO | WO 97/29472 | 8/1997 |

* cited by examiner

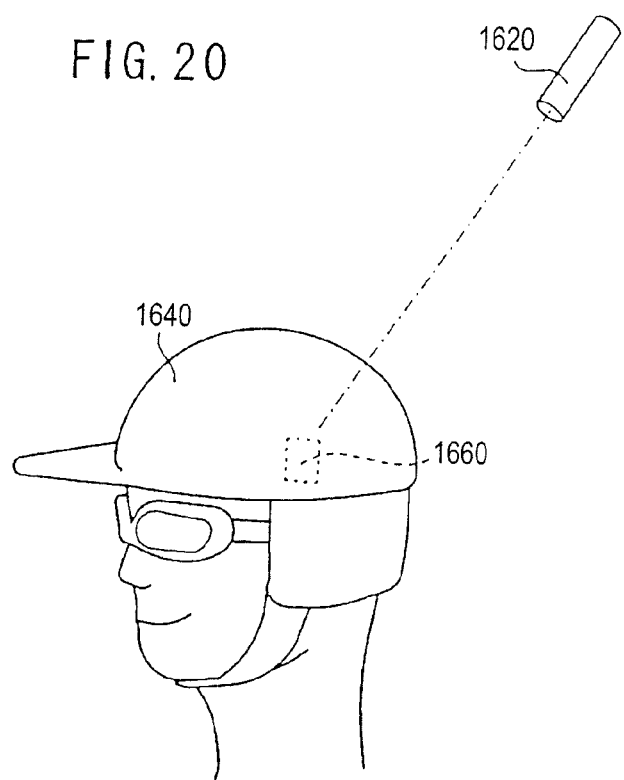

VEHICLE SIMULATION SYSTEM

CROSS-REFERENCE TO RELATED APPLICATION

The present application is a Divisional of co-pending U.S. patent application Ser. No. 11/441,143, filed May 26, 2006, and for which claims priority under 35 U.S.C. §119 to Japanese Patent Applications No. 2005-157416, and 2005-157765, both filed May 30, 2005, the entire contents of which are hereby incorporated by reference.

BACKGROUND OF THE INVENTION

1. Field of the Invention

The present invention relates to a vehicle simulation system for such uses as traffic safety education, games and physical training.

2. Description of Background Art

For simulated experience of the driving of airplanes, automobiles, motorcycles, bicycles and the like, simulation systems corresponding to the respective vehicles have been proposed, and a part of them have been put to practical use. In a bicycle simulation system among these simulation systems, the rider (operator) works pedals while being seated astride a saddle of a dummy bicycle to thereby perform a simulated cycling, a simulated velocity and the like are obtained by detecting the rotation of the pedals by a predetermined speed sensor, and a simulation process is executed.

In a vehicle simulation system, it is preferable to display on the front side a running scene varied according to a simulated running velocity, since realism is more enhanced. Meanwhile, when a display unit is provided not only on the front side but also on the rear side, a further realistic running situation is realized favorably. From this point of view, there has been proposed a driving system in which a large screen is disposed on the rear side of the driver (rider) so as to project a rear-side scene by a projector (see, for example, Japanese Patent Laid-open No. 2005-003923).

Meanwhile, in the driving system described in Japanese Patent Laid-open No. 2005-003923, the rear screen is large in size and heavy in weight, and a picture is projected thereon by the projector, so that the system needs a wide space, is difficult to install in a narrow place, and is unsuited to a use in which the system is conveyed or transported frequently.

In addition, since the projection light is shielded if the dummy vehicle or the driver is present between the projector and the screen, a scrupulous investigation is needed as to the layout of the projector. In the case where the projector cannot be laid out at an appropriate position opposite to the rear screen, the projected image would be distorted.

Furthermore, it depends on the driver's will to look at the projected rear background or not, so that the system is not suited to the use in which the driver is urged to check the rear side for the purpose of safety education and training. In addition, it is preferable to display on the front side a running scene varied according to a simulated running velocity, since realism is more enhanced. Meanwhile, when a display unit is provided not only on the front side but also at left and right side positions so as to display left and right scenes, a further realistic running situation is realized. From this point of view, there has been proposed a driving system in which large screens are disposed on the left and right sides of the driver (rider) so as to project the background by a projector (see, for example, Japanese Patent Laid-open No. 2005-003923). On the left and right screens in the driving system, the background is constantly displayed irrespectively of the posture of the driver or the direction of his head.

Meanwhile, in the driving system described in Japanese Patent Laid-open No. 2005-003923, to look at or not to look at the left and right scenes projected depends on the driver's intention. In the case where the driver is let check the left and the right for the purpose of safety education and training, particularly at the time of checking the left and the right at a crossing where the visibility is poor, it is recommended that the driver should lean forward and confirm safety assuredly. In the simulation system, even though the left and right scenes are being displayed, the effect of making the driver build up a habit of a safety checking action cannot be obtained if the check is left to the driver's intention.

In addition, in the driving system described in Japanese Patent Laid-open No. 2005-003923, the left and right screens are large in size and heavy in weight, and the projection of pictures by a projector or projectors needs a wide space, making it difficult to install the system in a narrow place. Furthermore, if the driver is present between the projector(s) and the dummy vehicle, the projection light would be shielded, so that a scrupulous investigation is needed as to the layout of the projector(s). In the case where the projector(s) cannot be laid out at appropriate position(s) opposite to the left and right screens, the projected pictures would be distorted.

SUMMARY AND OBJECTS OF THE INVENTION

The present invention has been made in consideration of the above-mentioned problems. Accordingly, one object of the present invention to provide a vehicle simulation system such that information can be displayed in a small size and with a simple configuration on the rear side of the driver. Another object of the present invention to provide a vehicle simulation system capable of realizing a simulation for letting the driver (operator or rider) securely check the safety on the left and right sides, according to the situation.

Still another object of the present invention to provide a vehicle simulation system capable of displaying left and right scenes while adopting a small and simple configuration.

According to one aspect of the present invention, the vehicle simulation system includes a dummy vehicle operated by a driver; a front display unit for displaying a scene based on the operation of the dummy vehicle; and a rear display unit connected to the dummy vehicle and provided on the rear side relative to a seated position of the driver. With the rear display unit thus connected to the dummy vehicle in an integral configuration, the vehicle simulation system can be configured to be small and simple.

In this case, where the rear display unit is a monitor capable of displaying a picture, realism can be enhanced by displaying a variety of practical pictures.

In addition, the rear display unit may be one or more lamps which are turned ON in a plurality of colors under control. This makes it possible to configure the rear display unit in a smaller and simpler configuration.

Furthermore, the vehicle simulation system may further comprise: an input device provided on the dummy vehicle for the driver to input signals therethrough; an input judging unit for making a comparative judgment between the signals inputted through the input device and information displayed on the rear display unit; and an output unit for indicating the result of the comparative judgment. This makes it possible to let the driver check the information displayed on the rear display unit, which is favorable for such uses as safety education and training.

Furthermore, when the rear display unit is one or more lamps which are turned ON in a plurality of colors under control and the input device has a plurality of switches indicative of the colors in which the lamp or lamps are turned ON, the operating method thereof is easy, and even children can operate the device with senses. Besides, the input device becomes simple in configuration and inexpensive.

According to this aspect system of the present invention, the rear display unit is connected to the dummy vehicle in an integral configuration, whereby the system is configured to be small and simple, and the system can be installed even in a narrow site. In addition, since the rear display unit is integral with the dummy vehicle, the system is excellent in portability, and is favorably used for a use in which the system is conveyed or transported frequently.

According to another aspect of the present invention, the vehicle simulation system includes a dummy vehicle operated by a driver; a front display unit for displaying a scene based on the operation of the dummy vehicle and visually confirmed when viewed from a first visual point set based on the seated position of the driver; and a side display unit provided on at least one of the left side and the right side and configured so that an image displayed thereon is not visually confirmed when viewed from the first visual point but is visually confirmed when viewed from a second visual point on the front side relative to the first visual point.

Where the side display unit is thus so set that it is not visually confirmed when viewed from the first visual point of the seated position but is visually confirmed when viewed from the second visual point, it is possible to let the driver take an assured action of checking safety on the left and right sides. In this case, a shielding means may be provided between the first visual point and the side display unit to thereby restrict the visibility of the side display unit.

Further, the front display unit may comprise a central display region for displaying a front scene, and left and right end display regions for displaying left and right scenes, and may have first mirror members for shielding the left and right end display regions from the first visual point and reflecting images toward lateral sides, second mirror members for reflecting the images reflected by the first mirror members, toward the second visual point, and magnifying lenses provided between the second visual point and the second mirror members. Where the left and right scenes are thus displayed on the left and right end display regions for displaying the left and right scenes, the front display unit functions also as side display units, resulting in a simple configuration. In addition, the reflection is conducted twice by the first mirror members and the second mirror members, whereby the positions and directions of display of the images can be freely set, making it possible to ensure that the images are almost not visually confirmed when viewed from the first visual point but can be visually confirmed when viewed from the second visual point. Further, with the magnifying lenses provided between the second visual point and the second mirror members, the images reflected in the second mirror members can be set small, and the images are almost not visually confirmed when viewed from the first visual point because of the absence of magnifying lenses therebetween.

Furthermore, the vehicle simulation system may have a position detection means for detecting the position of the driver, and a display switching means for switching the side display unit to a display mode and a non-display mode according to the position of the driver detected by the position detecting means. With the display switching means used, the display of the side display unit can be made effective only when the driver leans forward, so that the driver can be let take a checking action.

Besides, according to another aspect of the present invention, the vehicle simulation system includes a dummy vehicle operated by a driver; a front display unit and a side display unit for displaying a scene based on the operation of the dummy vehicle; a direction detecting means for detecting the direction of the head of the driver; and a display switching means for switching the side display unit to a display mode and a non-display mode according to the direction of the head of the driver detected by the direction detecting means.

This ensures that the side display unit can be set to a non-display mode when the driver's head is directed forwards, and the side display unit can be set to a display mode when the driver is directed either to the left or to the right, whereby the driver can be let securely take a left and right checking action.

Furthermore, according to still another aspect of the present invention, the vehicle simulation system includes a dummy vehicle operated by a driver; a front display unit for displaying a front scene in a central display region and displaying left and right scenes in left and right end display regions, based on the operation of the dummy vehicle; first mirror members for shielding the left and right end display regions from the visual point of the driver and reflecting images toward lateral sides; and second mirror members for further reflecting the images reflected by the first mirror members. Where the left and right scenes are thus displayed on the left and right end display regions for displaying the left and right scenes, the front display unit functions also as side display units, resulting in a small and simple configuration.

According to the vehicle simulation system of the present invention, the side display unit is so set as not to be visually confirmed when viewed from the first visual point of the seated position but to be visually confirmed when viewed from the second visual point, whereby the driver can be let securely to take a left and right safety checking action.

In addition, according to the vehicle simulation system of the present invention, the front display unit is provided with the left and right end display regions for displaying the left and right scenes, whereby the front display unit is made to function also as side display units, resulting in a small and simple configuration. Further, the left and right scenes can be displayed at left and right appropriate positions by the first mirror members and the second mirror members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 20 is a schematic diagram showing the rider's head and a direction sensor.

DETAILED DESCRIPTION OF THE PREFERRED EMBODIMENTS

Now, a bicycle simulation system 10 as a first embodiment of the vehicle simulation system according to the present invention will be described through an embodiment thereof below, referring to the accompanying FIGS. 1 to 10.

Figure 1:
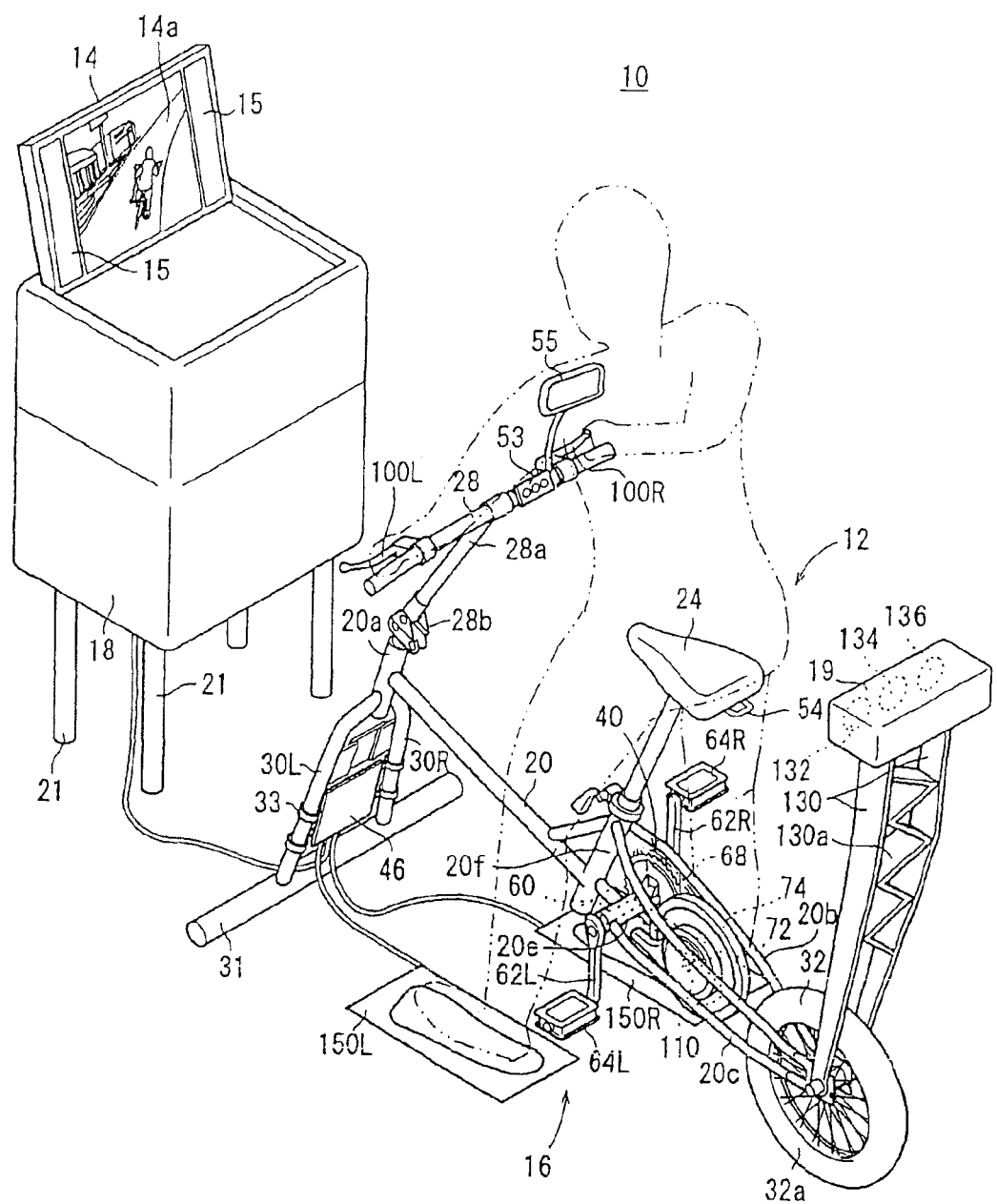
FIG. 1 is a perspective view of a bicycle simulation system according to a first embodiment of the present embodiment.

As shown in FIG. 1, the bicycle simulation system 10 according to this embodiment has a dummy bicycle (dummy vehicle) 12, a monitor (front display unit) 14 for displaying a scenery according to the riding on the dummy bicycle 12 on a screen 14a, a loudspeaker 15 for giving mimic sounds and vocal instructions to the rider, a mat switch 16 provided at a position where the rider rides on and get off the dummy bicycle 12, a main control unit 18 for performing total control of the bicycle simulation system 10, and a lamp unit (rear display unit) connected to the dummy bicycle 12 and provided on the rear side relative to the seated position of the rider. The main control unit 18 is disposed on the front side of the dummy bicycle 12, and the monitor 14 and the loudspeaker 15 are disposed at an upper portion of the main control unit 18 and at positions permitting easy visual checking by the rider on the dummy bicycle 12. The main control unit 18, the monitor 14 and the loudspeaker 15 are liftably supported by four struts 21 so that their height can be adjusted to the physical form of the rider. In addition, the main control unit 18 has the function of displaying on the screen 14a a picture corresponding to the simulation, and also has a function as a picture processing computer.

Next, the dummy bicycle 12 will be described. In the following description, as to a left-right pair of mechanisms in the dummy bicycle 12, "L" will be attached to the reference numeral for the left one, and "R" will be attached to the reference numeral for the right one.

The dummy bicycle 12 has a frame 20, a saddle 24 connected to the frame 20 through a seat pillar, a steering handle 28 turnable about a head tube 20a of the frame 20, two front forks 30R and 30L as a stand for fixingly supporting the head tube 20a, and a rear wheel 32 rotatably supported by a seat stay 20b and a chain stay 20c of the frame 20. A pipe 31 extending in a horizontal direction is provided at the tip ends of the front forks 30R and 30L, and the pipe 31 is grounded on a floor. A stem 28a of the steering handle 28 has a folding mechanism 28b in the vicinity of the head tube 20a, and can be folded or disassembled.

Though the front forks 30R, 30L are similar in shape to a front fork of a bicycle (or motorcycle) on an appearance basis, they differ from a real front fork in that they are not turned in conjunction with the steering handle 28 and they are not provided with a front wheel. The rear wheel 32 is provided with a tire 32a having a somewhat small diameter, and the tire 32a is grounded on the floor, whereby the rear wheel 32 functions also as a rear stand. Thus, the dummy bicycle 12 is supported and set upright by the front forks 30R, 30L and the rear wheel 32. Between the front forks 30R and 30L and the pipe 31, a controller 46 is fixed through a bracket 33.

In addition, the dummy bicycle 12 has a rotation drive mechanism unit 40, a speed detection mechanism unit 42, a brake mechanism unit 44, the controller 46, a steering angle sensor 50 (see FIG. 4) for detecting the steering angle of the steering handle 28, a microphone 52 for inputting the voice of the rider, an input device 53 for the rider to input signals therethrough, a recession switch 54 provided at a rear portion of the saddle 24, and a rear-view mirror 55 extending from the vicinity of the right end of the steering handle 28. The recession switch 54 is a switch to be operated when the rider gets off the dummy bicycle 12 and performs a predetermined simulated receding motion.

The rotation drive mechanism unit 40 has a pair of cranks 62L and 62R connected to left and right portions of the crankshaft (a rotary shaft of the pedals) 60 provided inside a crank tube 20e, pedals 64L and 64R provided at the tip ends of the cranks 62L and 62R, a front sprocket 66 provided on the crank 62R, a rear sprocket 70 rotationally driven by the front sprocket 66 through a chain 68, and an iron-made flywheel (rotary body) 74 rotationally driven by the rear sprocket 70 through a one-way clutch (also called free hub) 72. The flywheel 74 is provided between the seat tube 20f and the rear wheel 32, and is rotatably supported by the one-way clutch 72.

The one-way clutch 72, by a ratchet mechanism therein, transmits only a rotational drive force in the forward direction of the rear sprocket 70. Therefore, when the crankshaft 60 is rotated in the reverse direction or when the rotation of the crankshaft 60 is stopped during the forward rotation of the flywheel 74, the rotating condition (forward rotation or stoppage) of the flywheel 74 at that time is maintained, irrespectively of the crankshaft 60.

Figure 2:
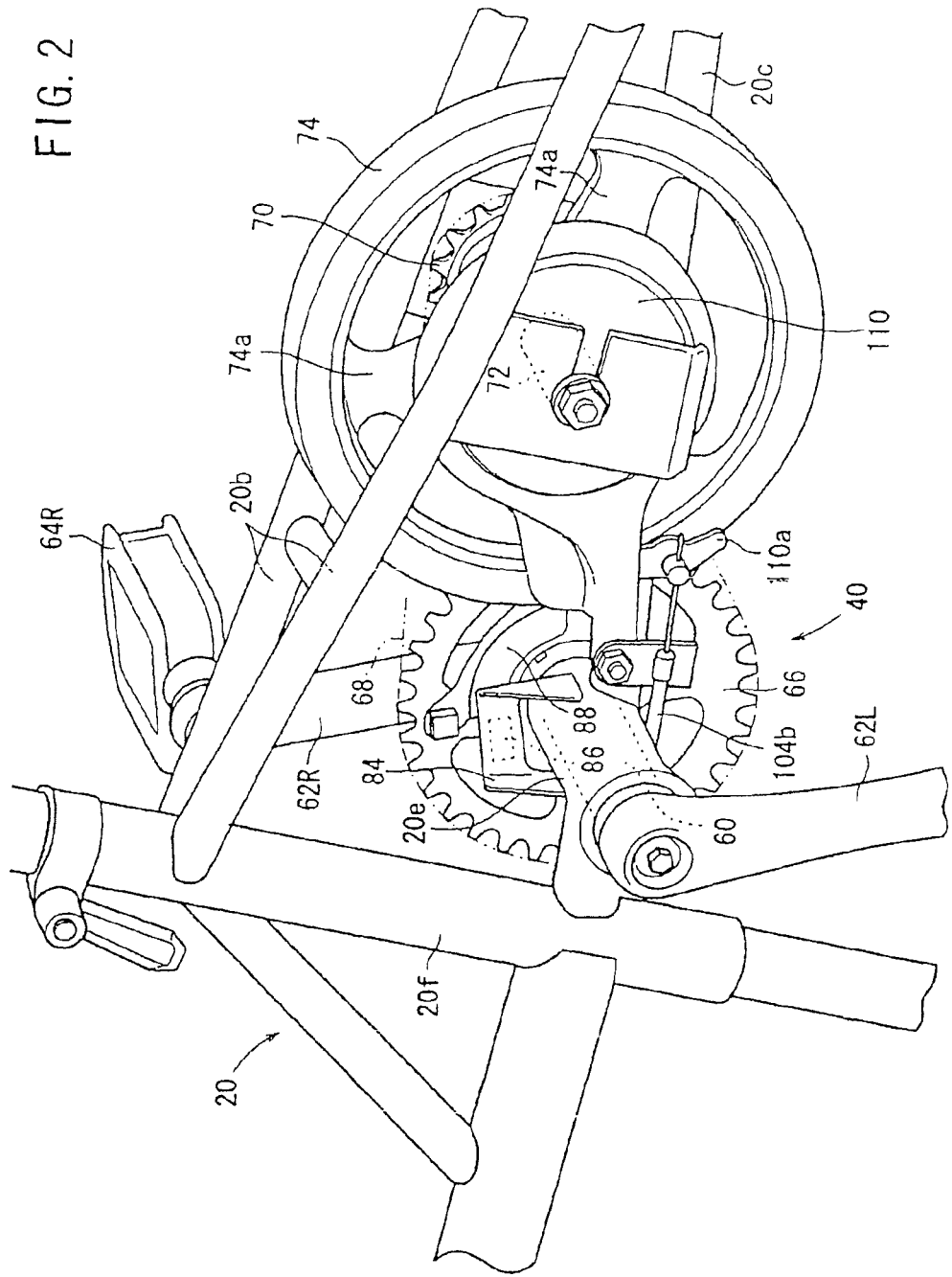
FIG. 2 is a perspective view of a rotation drive mechanism unit in a dummy bicycle and the vicinity thereof.
Figure 3:
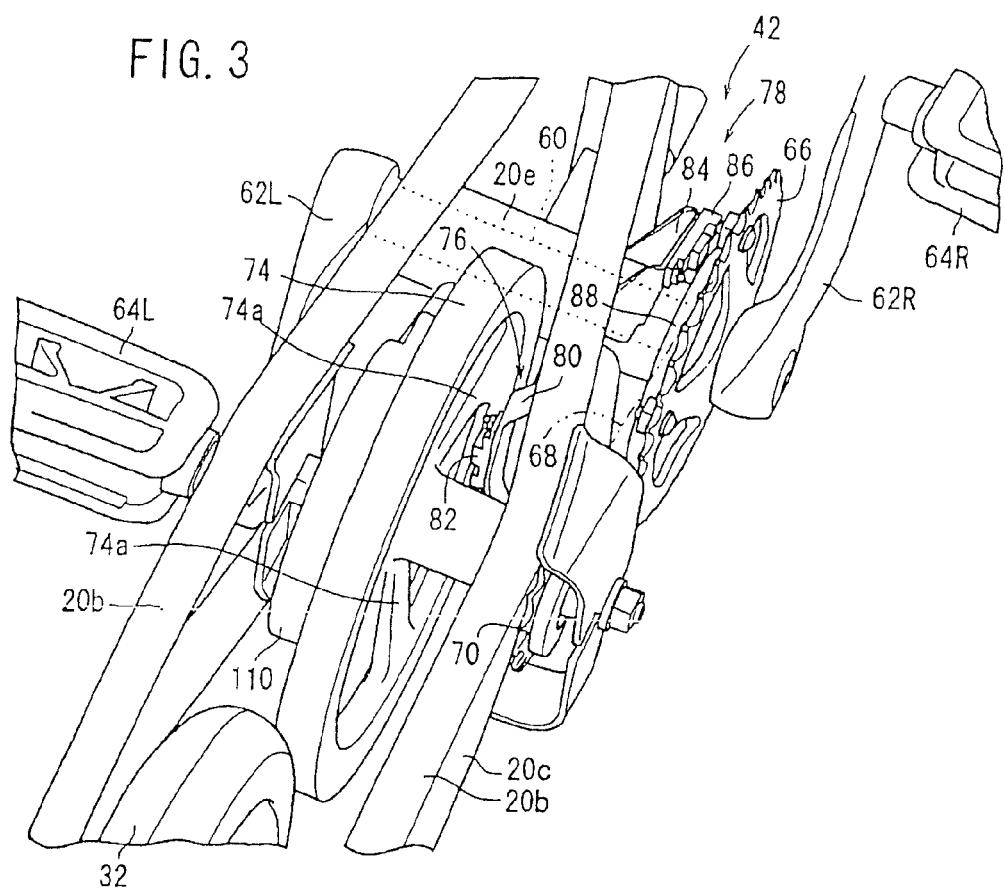
FIG. 3 is a perspective view, as viewed from the skew upper side, of a flywheel in the dummy bicycle and the vicinity thereof.

As shown in FIGS. 2 and 3, the speed detection mechanism unit 42 has a wheel rotation detecting portion 76 and a crank rotation detecting portion 78. The wheel rotation detecting portion 76 has a mount bracket 80 provided over the range from the seat stay 20b on the right side to a chain stay 20c, and a first speed pickup 82 provided on the mount bracket 80. The first speed pickup 82 is disposed at a position closely opposed to three spokes 74a of the flywheel 74, and, when the flywheel 74 is rotated, the first speed pickup 82 supplies the controller 46 with a signal indicating the presence or absence of the spoke 74a.

The crank rotation detecting portion 78 has a mount bracket 84 fixed to the crank tube 20e, a second speed pickup 86 provided on the mount bracket 84, and a detected rotor 88 fixed to the inside of the front sprocket 66. The detected rotor 88 is an about 90° circular arc-shaped plate, and is disposed closely opposed to the second speed pickup 86. When the pedals 64L and 64R are worked and the crankshaft 60 and the front sprocket 66 are thereby rotated, the second speed pickup 86 supplied the controller 46 with a signal indicating the presence or absence of the detected rotor 88. The second speed pickup 86 and the first speed pickup 82 are interchangeable.

Figure 4:
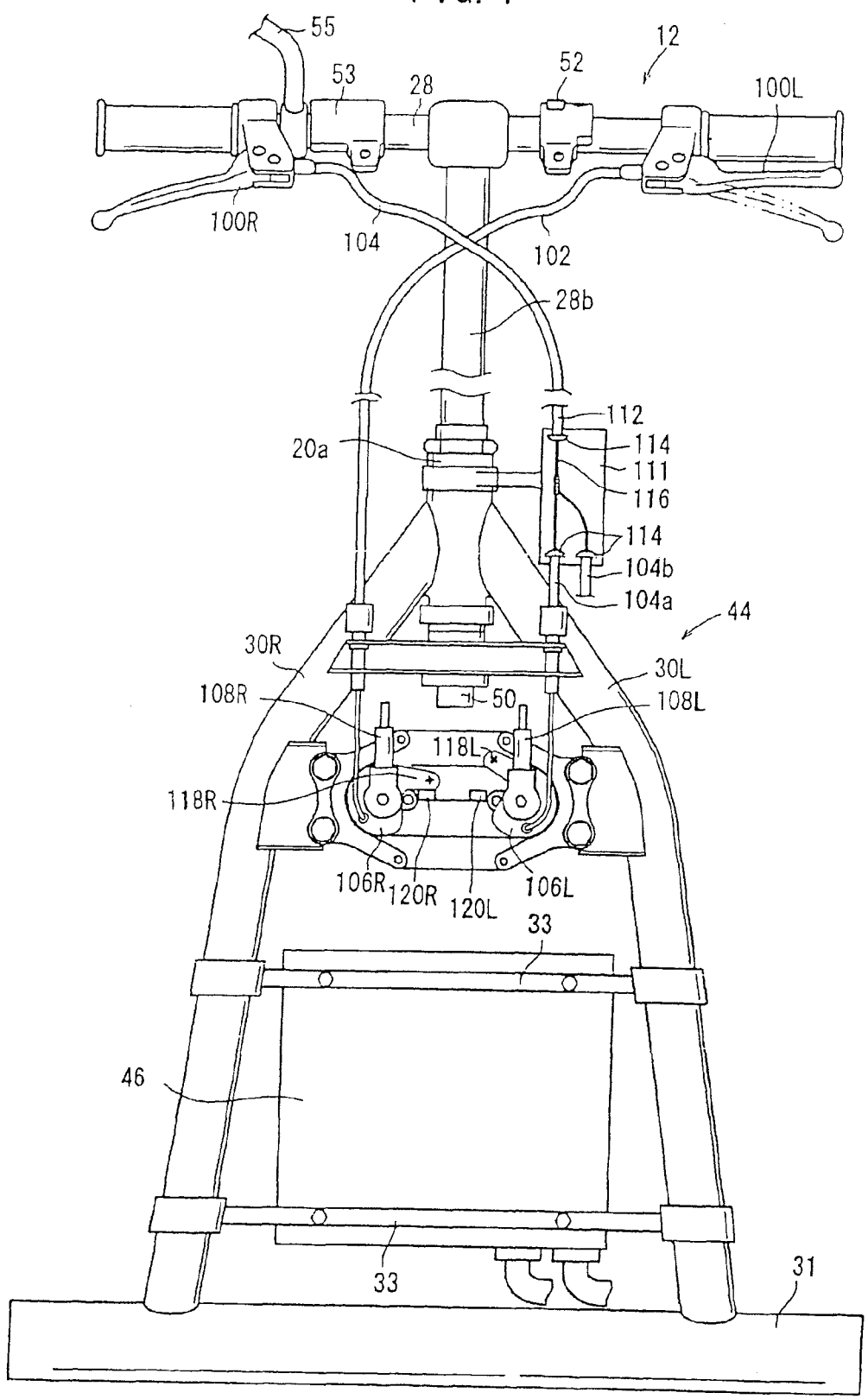
FIG. 4 is a front view of the dummy bicycle.

As shown in FIG. 4, the brake mechanism unit 44 has two brake levers 100L and 100R provided on the steering handle 28, brake wires 102 and 104 connected respectively to the brake levers 100L and 100R, elastically rotatable pulleys 106L and 106R, rotation sensors 108L and 108R, and a drum brake 110 (see FIG. 3) for braking the flywheel 74.

The brake wire 104 is bifurcated by a branch mechanism 111 in its course, a brake wire 104a on one side is extended toward the front forks 30R, 30L, and a brake wire 104b on the other side is connected to the drum brake 110. At the branching portion of the brake wire 104, a part of an outer wire 112 is peeled, an end portion thereof is supported by a ring 114, an exposed inner wire 116 is connected with two inner wires by press bonding, caulking, welding or the like, one of the two inner wires constitutes the brake wire 104a, and the other of the two inner wires constitutes the brake wire 104b. Therefore, with the brake lever 100R operated, the two brake wires 104a and 104b are pulled simultaneously.

The brake wire 104a and the brake wire 102 cross each other in their course, and lower end portions thereof are connected to the pulleys 106R, 106L. When none of the brake wires 100L and 100R is pulled, the pulleys 106L and 106R are elastically biased by springs (not shown) so that projected portions 118L and 118R are directed upward. In this instance, the brake levers 100L and 100R are elastically biased by the pulleys 106L and 106R, to be separate from the steering handle 28.

With the brake levers 100L, 100R pulled toward the steering handle 28, the pulleys 106L, 106R are elastically rotated, whereby the projected portions 118L and 118R are directed downward. The pulleys 106L, 106R can be rotated until the projected portions 118L, 118R abut on stoppers 120L, 120R.

The rotation angles of the pulleys 106L, 106R can be detected by rotation sensors 108L, 108R, and signals of the angles detected are supplied to the controller 46. The controller 46 supplies the main control unit 18 with a signal according to the signals of the rotation angles of the pulleys 106L and 106R detected, in other words, the amounts of operation of the brake levers 100L and 100R.

As shown in FIG. 3, the drum brake 110 is disposed concentrically with the flywheel 74, and an arm 110a thereof is connected to an end portion of the brake wire 104b. The drum brake 110 has a drum body in the inside thereof connected to and rotated as one body with the flywheel 74. In addition, when the brake lever 100L is operated and the brake wire 104b is pulled thereby, the arm 110a is inclined, and a brake shoe therein is opened in the direction of the outside diameter so as to make contact with the drum body, whereby a frictional force is generated and the flywheel 74 is braked.

Figure 5:
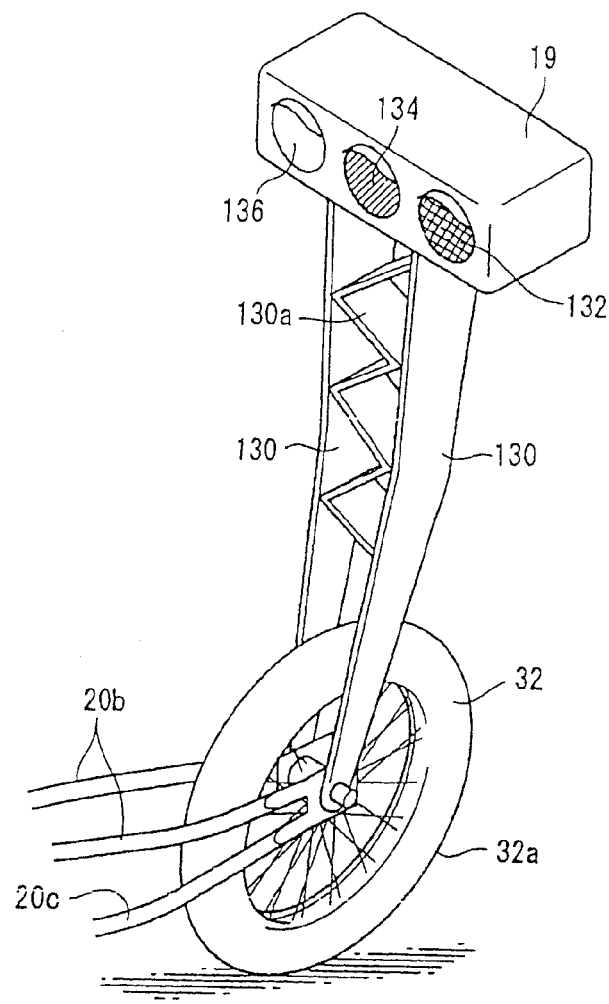
FIG. 5 is a perspective view of a lamp unit provided on the rear side of the rider.

As shown in FIGS. 1 and 5, the lamp unit 19 is supported by two stays 130 which are fixed to the left and right seat stays 20b and the chain stay 20c, is located on the skew rear side of the rear wheel 32 and on the rear side of the driver seated on the saddle 24, and so located that it is visually recognized by the driver when the driver looks back assuredly or that it can be visually recognized through the rear-view mirror 55. Reinforcing plates 130a are provided between the two stays 130. Lower end portions of the stays 130 are fixed together with the hub of the rear wheel 32.

On the front face of the lamp unit 19, three round lamps 132, 134 and 136 are arranged side by side in this order, which emit light in red, yellow, and green, respectively. The lamps 132, 134 and 136 are individually turned ON under control of the main control unit 18 through the controller 46. Since it suffices for the lamps 132, 134 and 136 to be visually recognized by the driver, it is unnecessary for them to be large in size, so that the lamp unit 19 as a whole can be configured to be small in size and light in weight. Incidentally, in FIGS. 5 and 6, red is indicated by cross-hatching, yellow is indicated by single hatching, and green is indicated by the absence of hatching.

Figure 6:
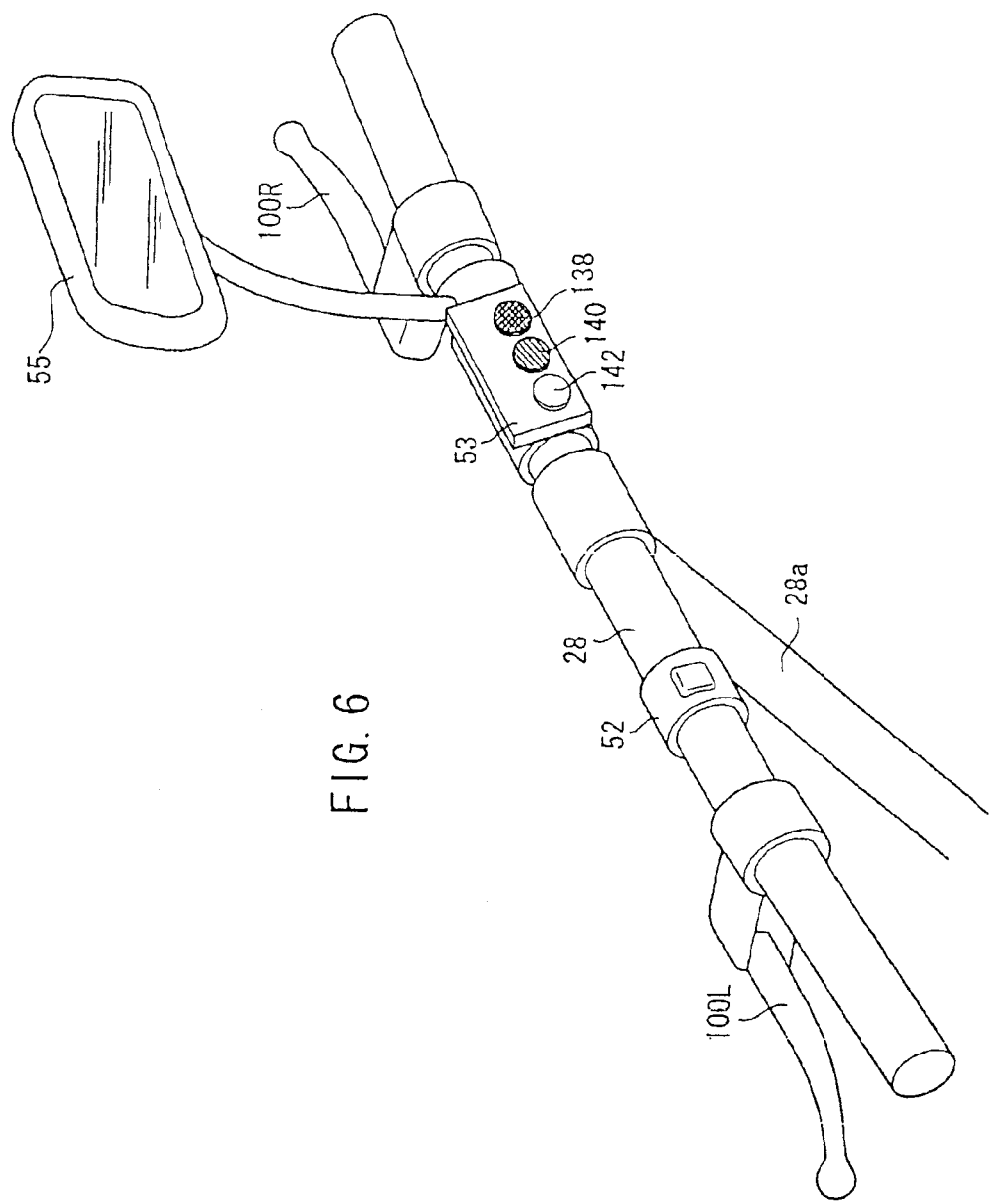
FIG. 6 is a perspective view of a steering handle.

As shown in FIGS. 4 and 6, the steering angle sensor 50 is provided at a lower end portion of the head tube 20a, and detects the turning angle of the stem 28a supporting the steering handle 28. The microphone 52 is provided on the steering handle 28, and is close to the face of the rider, so that the rider's voice is clearly inputted. The input device 53 is provided at such a position on the steering handle 28 as to promise an easy inputting operation, and, on the upper face thereof, three round switches 138, 140 and 142 are arranged side by side, in the color order of red, yellow and green from the right. Namely, the input device 53 is substantially analogous in shape to the lamp unit 19, and the color arrangement of the switches 138, 140 and 142 is the same as that of the lamps 132, 134 and 136. In addition, an array of characters meaning "Check behind." are printed on the upper face of the input device 53. It suffices for the switches 138, 140 and 142 to have such a size that they can be depressed by a finger, so that the input device 53 as a whole can be configured to be small in size, light in weight and inexpensive.

The steering angle sensor 50, the microphone 52, the recession switch 54 and the switches 138, 140 and 142 are connected to the controller 46, and supply the controller 46 with a steering angle signal, a vocal signal and switch operation signals, respectively.

Returning to FIG. 1, the mat switch 16 is composed of a left switch 150L and a right switch 150R, which are independent and are disposed at such positions that the rider can tread thereon with his feet while being astride the head tube 20a of the frame 20 when he gets off. Namely, the left foot treads on the left switch 150L, and the right foot treads on the right switch 150R. The left switch 150L and the right switch 15OR are turned ON when trodden on, and supply ON signals to the controller 46.

The left switch 150L and the right switch 150R are each in a thin mat-like form, having a backing rubber, longitudinal electrode wires and transverse electrode wires arranged in a lattice form opposite to the backing rubber, and a soft insulating material inserted between the backing rubber and a face rubber. The longitudinal electrode wires and the transverse electrode wires are connected to two output terminals (not shown), respectively. When the rider treads on the face rubber with his foot, the face rubber is elastically deformed while compressing the insulating material, whereon the longitudinal electrode wires and the transverse electrode wires make contact with each other at their intersecting locations. As a result, the two output terminals are put into conduction, and the switch is turned ON. When the foot is put off, the longitudinal electrode wires and the transverse electrode wires are separated from each other, and the switch is turned OFF. Incidentally, the mat switch 16 may not necessarily be of the left-right independent type; a mat switch 16a having two switches formed integrally may be adopted, and may be disposed on the left side of the dummy bicycle 12, for example. With the mat switch 16a arranged, when the rider having got off the dummy bicycle 12 to the left side stamps there, a bicycle-pushing walking action in a walking mode which will be described later is realized more realistically.

Figure 7:
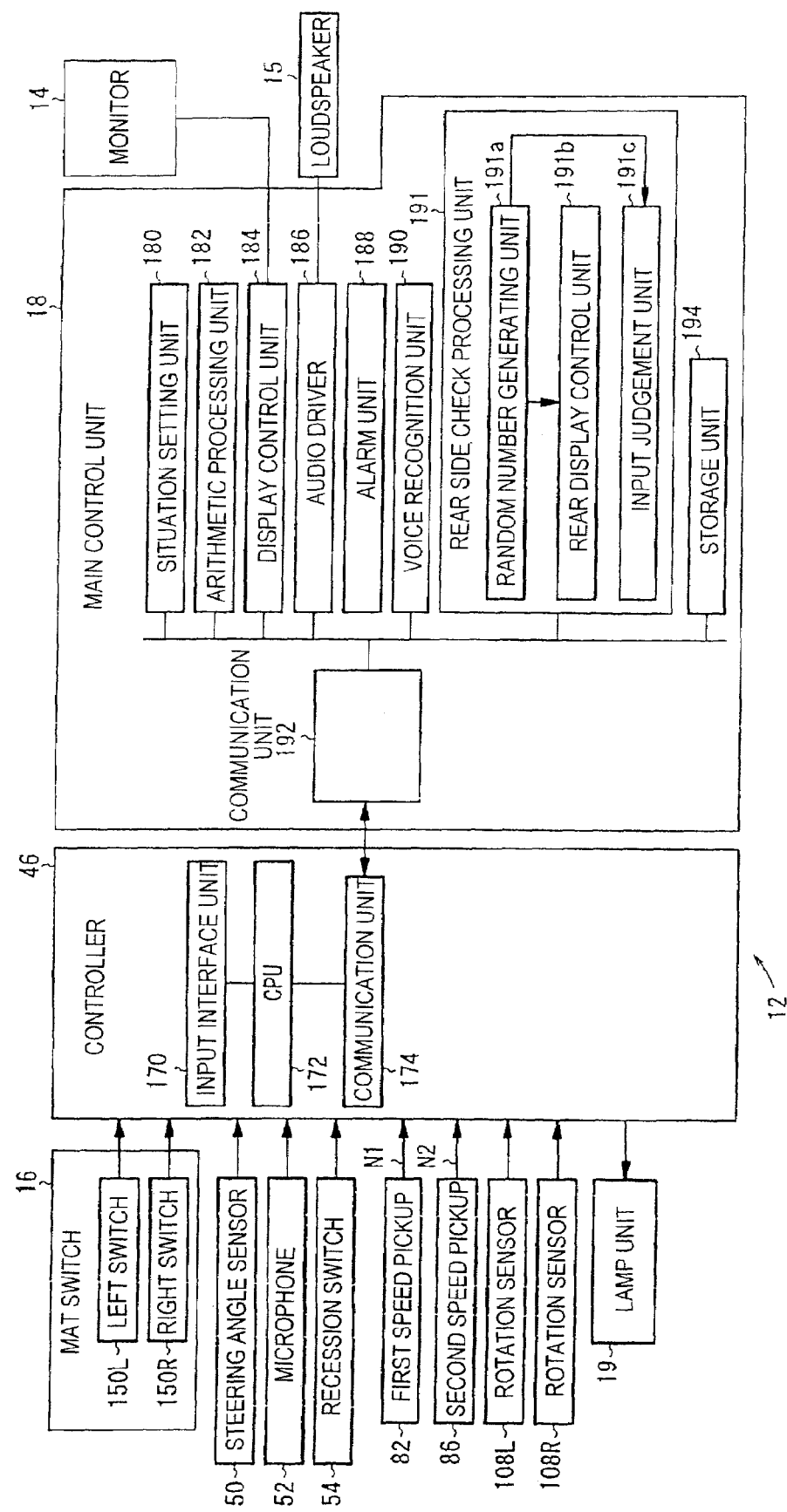
FIG. 7 is a block diagram of electrical component parts of the bicycle simulation system.

As shown in FIG. 7, the controller 46 has an input interface unit 170, a CPU (Central Processing Unit) 172, and a first communication unit 174. The first communication unit 174 is connected to a second communication unit 192 of the main control unit 18, so as to perform real-time communication with the main control unit 18. The input interface unit 170 is connected with the steering angle sensor 50, the microphone 52, the first speed pickup 82, the second speed pickup 86, the rotation sensors 108L, 108R, the recession switch 54, the left switch 150L, and the right switch 150R, for inputting analog signals and digital signals.

The CPU 172 processes or converts the signals from the above-mentioned electrical component parts and transmits the processed or converted signals to the main control unit 18 via the first communication unit 174. For example, the CPU 172 obtains the rotation speed N I of the flywheel 74 and the rotation speed N2 of the crankshaft 60 from the frequencies of the signals supplied from the first speed pickup 82 and the second speed pickup 86, multiplies the rotation speed N1 by a predetermined constant to obtain a simulated running velocity V, and supplies the simulated velocity V to the main control unit 18.

The main control unit 18 has a situation setting unit 180 for setting a simulated cycling situation, an arithmetic processing unit 182 for executing an arithmetic process according to the running conditions, a display control unit 184 for controlling the display on the monitor 14, an audio driver 186 for an acoustic output of the loudspeaker 15, an alarm unit 188 for issuing predetermined alarms to the rider, a voice recognition unit 190 for recognizing the voice inputted from the microphone 52, a rear side check processing unit 191, a second communication unit 192 for controlling communication with the first communication unit 174, and a storage unit 194 capable of reading and writing of data. The rear side check processing unit 191 has a random number generating unit 191a, a rear display control unit 191b for controlling the turning ON of the lamp unit 19, and an input judgment unit 191c for comparative judgment between the signals inputted through the input device 53 and information indicated by the lamp unit 19.

In practice, the main control unit 18 has the CPU (Central Processing Unit) as a control main body and a RAM (Random Access Memory), a ROM (Read Only Memory), an HD (Hard Disk) and the like as storage units, and the functional units of the main control unit 18 shown in FIG. 7 are so realized that the CPU reads a program recorded on the HD, and executes the program while cooperating with the ROM, the RAM and predetermined hardware.

Now, a method of simulating the running of a bicycle by use of the bicycle simulation system 10 configured as above will be described below.

Figure 8:
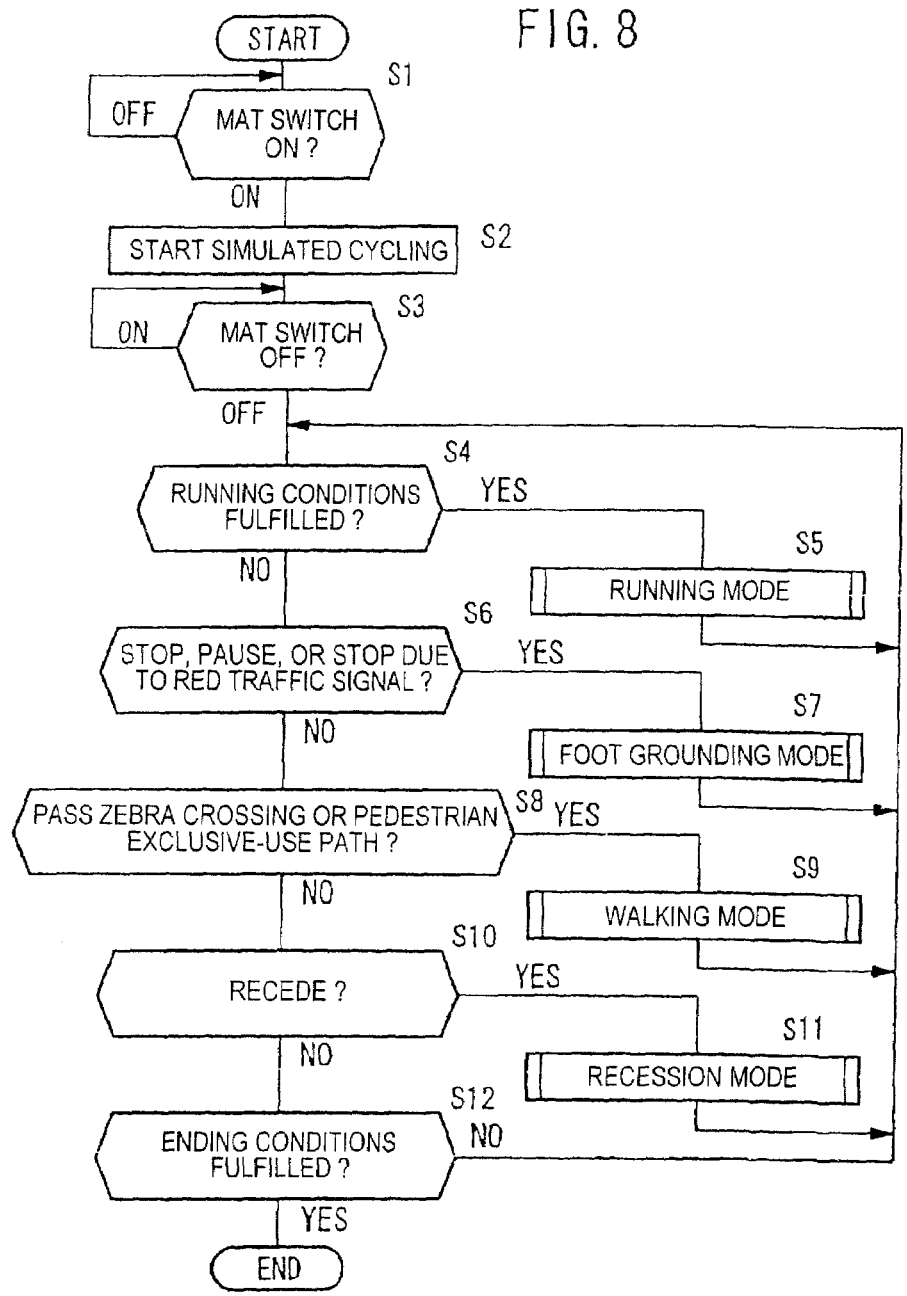
FIG. 8 is a flowchart of a main routine in a method of performing a simulated cycling by use of the bicycle simulation system.

In step S1 in FIG. 8, it is checked whether or not the mat switch 16 is turned ON. Specifically, when at least one of the left switch 150L and the right switch 150R of the mat switch 16 is turned ON, step S2 is entered, whereas when both of the switches are OFF, the control process stands by at step S1. In other words, when the rider stands on the mat switch 16, step S2 is automatically entered, and, until then, the control process stands by at step S1, and a predetermined power saving mode (for example, the monitor 14 is turned OFF) can be maintained.

In step S2, a simulated cycling is started, and a predetermined starting picture is displayed on the screen 14a. In the starting picture, an image of a bicycle at rest and an image of a person as the rider standing by the bicycle are displayed. In addition, the characters "A simulated cycling is going to be started. Please seat yourself on the saddle and work the pedals." are displayed on the screen 14a, or the voice of the same words is issued from the loudspeaker 15.

Thus, the simulated cycling can be automatically started by treading on the mat switch 16, and the simulated cycling can be started without need for a complicated operation and without any sense of incompatibility. Besides, it suffices for the rider to carry out operations according to the instructions issued from the screen 14a or the loudspeaker 15, so that a manual or the like is not needed, the operations are easy to carry out, and even children can perform the simulated cycling.

In step S3, it is checked whether or not the mat switch 16 is turned OFF. Specifically, when the left switch 150L and the right switch 150R are both turned OFF, step S4 is entered, whereas when at least one of the switches is ON, the control process stands by at step S3.

To be more specific, when the rider is seated astride the saddle 24 and puts his feet off the mat switch 16, step S4 is automatically entered, and an actual running in the simulated cycling can be started. In this instance, the starting picture is ended, and an image of the bicycle and an image of the person riding on the bicycle are displayed.

In step S4, it is checked whether or not predetermined running conditions are fulfilled. When the running conditions are fulfilled, a running mode in step S5 is entered, whereas when the running conditions are not fulfilled, step S6 is entered. The running mode is a mode in which the rider seated on the saddle 24 works the pedals 64L and 64R and manipulates the steering handle 28 so as to perform a simulated running. In this case, a scene varied according to a simulated running velocity V and a steering angle obtained based on the first speed pickup 82 and the steering angle sensor 50 is displayed on the screen 14a (see FIG. 1). In the running mode, it is recommendable to issue a predetermined alarm in the case where the simulated running velocity V is not less than a prescribed velocity, in the case where the virtual bicycle has step out of a virtual road, or in other similar cases.

In step S6, it is checked whether or not the situation of the simulated cycling is a stop, a pause, or a red traffic signal. In the cases of a stop, pause or red traffic signal, a foot grounding mode in step S7 is entered; in other cases, step S8 is entered. In the foot grounding mode, the rider operates the brake levers 100L, 100R to bring the simulated running velocity V to 0, thereafter gets off the dummy bicycle, and treads on the mat switch 16. As a result, a scene in which the rider and the bicycle are at rest in the presence of a red traffic signal is displayed on the screen 14a. The foot grounding mode is canceled when the traffic signal is changed from red to green, or when confirmation of safety on the left and the right is made assuredly, on the basis of the situation in the simulated cycling. After the foot grounding mode is thus canceled, the rear side checking process is executed before the rider is seated astride the saddle. The rear side checking process will be described later.

In step S8, it is checked whether or not the situation in the simulated cycling is the case of passing a pedestrian priority path such as zebra crossing or a pedestrian exclusive-use path such as footpath. In the case of passing a pedestrian priority path or a pedestrian exclusive-use path, a walking mode in step S9 is entered; in other cases, step S10 is entered. The walking mode is a mode for the rider to walk while pushing the bicycle along a pedestrian exclusive-use path or the like, for example, a mode for learning to walk while pushing the bicycle so as not to trouble other pedestrians or the like. In this case, the rider gets off the dummy bicycle 12 and stamps on the mat switch 16, whereby the walking conditions are reproduced, and a corresponding scene is displayed on the screen 14a of the monitor 14.

In step S10, it is checked whether or not the situation in the simulated cycling is a situation of moving the bicycle backward. In the case of backward movement (recession), a recession mode in step S11 is entered; in other cases, step S12 is entered. The recession mode is a mode in which the rider having got off the bicycle recedes while pushing the bicycle. In this case, the rider gets off the dummy bicycle 12, and stamps on the mat switch 16 while turning ON the recession switch 54, whereby the receding conditions are reproduced, and a corresponding scene is displayed on the screen 14a of the monitor 14.

In step S12, it is checked whether or not predetermined end conditions are fulfilled. When the end conditions are fulfilled, the simulated cycling is ended, whereas when the conditions are not fulfilled, the control process returns to step S4, and the simulated cycling is continued. Besides, the control process returns to step S4 also after the processing in each of steps S5, S7, S9 and S11 is finished.

In the case of ending the simulated cycling, it is checked whether or not the mat switch 16 is turned ON, like in step S1. In this case, based on the condition where the mat switch 16 is turned ON, it can be detected that the rider has got off the dummy bicycle 12; based on this, the simulated cycling is ended, and the system returns into a stand-by state such as a predetermined power saving mode. Incidentally, in the case where no operation of the dummy bicycle 12 is done in a predetermined period after the mat switch 16 is turned OFF in step S2, it is considered that the rider has once trodden on the mat switch 16 but has walked away without riding on the dummy bicycle 12; in this case, also, it is recommendable for the system to return into the stand-by state.

Figure 9:
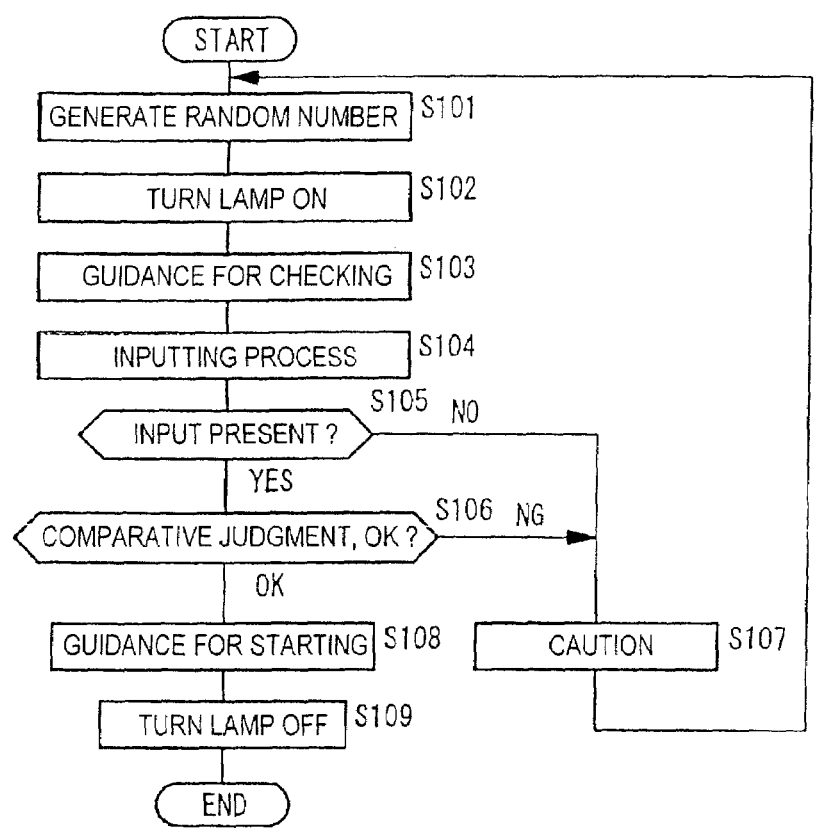
FIG. 9 is a flowchart showing the procedure of a rear side checking process.

Now, the rear side checking process will be described below referring to FIG. 9. The rear side checking process is conducted, for example, before the start of the running mode or after the canceling of the foot grounding mode and before the rider is seated astride the saddle. The timing of the execution of the rear side checking mode is judged by the situation setting unit 180, and is carried out mainly by the rear side check processing unit 191.

First, in step S101, a random number R of any one of 1, 2 and 3 is generated by the random number generating unit 191a. The random number R thus obtained is supplied to the rear display control unit 191b and the input judgment unit 191c.

In step S102, the lamp unit 19 is turned ON based on the random number R under control of the rear display control unit 191b. Specifically, the red lamp 132 is turned ON when the random number R is 1, the yellow lamp 134 is turned ON when the random number R is 2, and the green lamp 136 is turned ON when the random number R is 3. As a result, one of the lamps 132, 134 and 136 is turned ON, whereby the information based on the random number R is displayed.

In step S103, a rear side check guidance is made. Specifically, the characters "Before riding on the vehicle, please check behind and depress the corresponding switch." are displayed on the screen 14a, or the voice of the same words is issued from the loudspeaker 15, to prompt the rider to operate the switch of the input device 53. Thus, the rider is wanted to check the image reflected in the rear-view mirror 55, or to turn back and check the ON/OFF conditions of the lamp unit 19, and is wanted to one of the switches 138, 140 and 142 on the input device 53 according to the color of the one lamp of the lamps 132, 134 and 136 which is ON. In the case of a high-grade rider, the process of step S103 may be omitted and the rider may be let check behind voluntarily.

In step S104, a switch signal is inputted through the input device 53, and the signal thus obtained is made to be an input value S. The input signal S is 0 in its initial state, a setting S←S+1 is conducted when the red switch 138 is ON, a setting S←S+2 is conducted when the yellow switch 140 is ON, and a setting S←S+4 is conducted when the green switch 142 is ON. When the switches 138, 140 and 142 are individually turned ON, the input value S becomes 1, 2 and 4, respectively, and, when a plurality of switches are depressed simultaneously, the input value S becomes 3 or 5 to 7.

In step S105, it is judged whether or not a switch signal has been inputted. When the inputting is confirmed, step S106 is entered; when the inputting is yet to be done and a predetermined time has passed, step S107 is entered. When the predetermined time has not yet passed, the system stands by until inputting is done.

In step S106, the input value S and the random number R are comparatively judged by the input judgment unit 191c. When S=R, it is judged that a right switch operation has been made, and step S108 is entered; in other cases, it is judged that a wrong operation has been made, and step S107 is entered.

In step S107, a predetermined caution is outputted. Specifically, the characters "Please depress the switch." Or "The operation is wrong. Please retry from the checking behind." are displayed on the screen 14a, or the voice of the same words is issued from the loudspeaker 15, the process returns to step S101, and the rider is let check behind again.

On the other hand, in step S108, a start guidance is outputted. Specifically, the characters "Check of the safety behind has been made rightly. Please start cycling." are displayed on the screen 14a, or the voice of the same words is issued from the loudspeaker 15.

In step S109, all the lamps 132, 134 and 136 are turned OFF under the action of the rear display control unit 191b. Thereafter, the process shown in FIG. 9 is ended, and the control process returns to the process according to the main routine (see FIG. 8).

As has been described above, according to the bicycle simulation system 10 in the present embodiment, the lamp unit 19 is connected to the dummy bicycle 12 in an integral configuration, whereby the bicycle simulation system 10 is configured to be small and simple, and can be installed even in a narrow site. In addition, the lamp unit 19 is excellent in portability due to its integrality with the dummy bicycle 12, which makes it possible to use the bicycle simulation system 10 for such a use that the system is conveyed or transported frequently.

The lamp unit 19 is turned ON in three colors under control, and has a small, light and inexpensive configuration in which the lamps 132, 134 and 136 are main component elements. Since the lamps 132, 134 and 136 are selectively put into light emission based on the random number R, there is no possibility that the rider memorizes the light emission pattern, so that the rider can be let check behind assuredly.

Furthermore, since the bicycle simulation system 10 has the input device 53 and the input judgment unit 191c for comparative judgment between the input value S actually inputted and the random number R, the rider can be let input the information displayed on the lamp unit 19, so that the bicycle simulation system 10 can be used favorably for such uses as safety education and training.

Since the input device 53 is substantially analogous to the lamp unit 19 in shape and the switches 138, 140 and 142 are the same as the lamps 132, 134 and 136 in color arrangement and shape (round), the input device can be operated without relying on a manual or the like but with senses, so that the input device can be easily operated even by children or the like.

In addition, for safety confirmation on an educational basis, if the number of different-color lamps provided in the lamp unit 19 is too small, an appropriate training cannot be attained; on the other hand, if the number is too large, an excessive confirmation alienated from the practical safety checking action is needed. Therefore, the number of the lamps provided in the lamp unit 19 is preferably in the range of 2 to 10, more preferably 3 to 5.

Incidentally, a setting may be made in which the colors of the lamps 132, 134 and 136 have respective meanings, for example, the red lamp 132 for prohibition of running, the yellow lamp 134 for caution in running, and the green lamp 136 for permission to run, and a predetermined caution may be outputted when the running is started (the simulated running velocity V becomes V≠0) while the red lamp 132 is ON. In this case, the input device 53 may be omitted.

The shape of the lamps 132, 134 and 136 is not limited to the round shape, and the lamps may be turned ON in the shapes of marks modeled after a four-wheel vehicle, a bicycle, a pedestrian and the like. In this case, it suffices for the rider to operate the input device 53, based on the meanings represented by the marks. Further, the lamps provided in the lamp unit 19 are not limited to those of a monochromic light emission type, and a single lamp capable of emitting light switchedly in three colors or so may also be used. Furthermore, the display means is not limited to those of the light emission type such as lamps, and a color indicator board of a switched masking type may also be used.

The means for inputting the result of checking behind to the input judgment unit 191*c* is not limited to the input device 53, and, for example, a voice may be inputted by use of the microphone (input device) 52. The means for outputting the comparative judgment conducted by the input judgment unit 191*c* is not limited to the screen 14*a* or the loudspeaker 15, and an alarm buzzer for exclusive use or the like may be used. The stays 130 are not limited to the beam structure, and a deformable structure composed of a spiral metal sheet or the like may be used.

Figure 10:
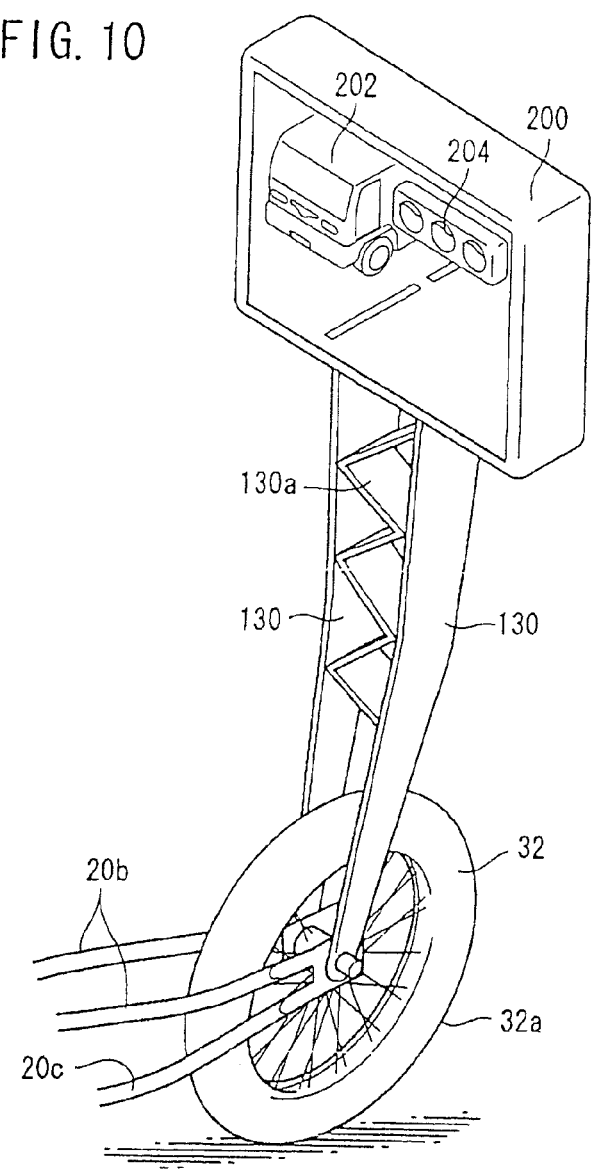
FIG. 10 is a perspective view of a monitor provided on the rear side of the rider.

In the above description, the lamp unit 19 as a rear display unit for checking behind has been described as an example, but a small, light monitor 200 as shown in FIG. 10 may also be used. The monitor 200 is of a liquid crystal display type, for example, and is supported by the stays 130 in the same manner as the lamp unit 19. On the monitor 200, practical various pictures (inclusive of a motion picture) according to the situation of simulated cycling are displayed under the action of the main control unit 18, whereby realism is enhanced.

In this case, a procedure suffices in which an image 202 of a vehicle is displayed, whereby the rider is let confirm that a vehicle is approaching from behind or is becoming more distant, the rider is prompted to perform a predetermined inputting operation through the input device 53, and it is comparatively judged whether or not a right checking has been done. Besides, by displaying an image 204 modeled after the lamp unit 19, the same process as the rear side checking process shown in FIG. 9 can be conducted. When the picture displayed on the monitor 200 is varied based on the simulated running velocity V, a more realistic simulation can be realized.

In displaying of a picture on the monitor 200, a separately arranged mechanism such as a projector is not needed, the monitor 200 can be installed easily, and distortion of the image would not occur. In addition, since there is no projector, obstruction of the picture projection by the rider or the dummy bicycle 12 is obviated.

Next, the vehicle simulation system according to the second to fifth embodiments of the present invention will be described referring to the accompanying FIGS. 11 to 20.

Figure 11:
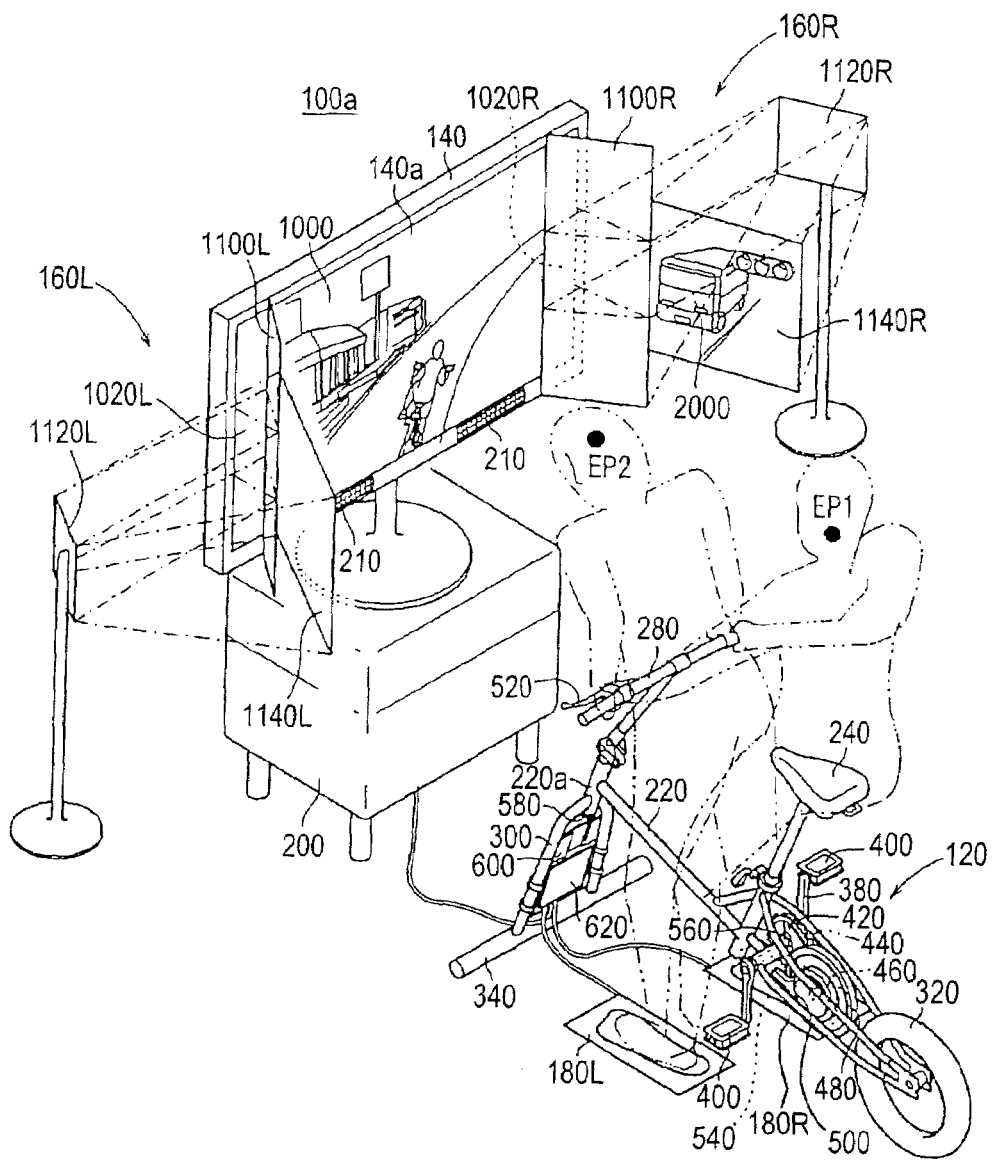
FIG. 11 is a perspective view of a bicycle simulation system according to a second embodiment of the present invention.

As shown in FIG. 11, the bicycle simulation system 10*a* according to a second embodiment has a dummy bicycle (dummy vehicle) 120 operated by a rider (driver), a front monitor (front display unit) 140 for displaying a scene based on the operation of the dummy bicycle 120, a left side display unit 160L for displaying a left scene and a right side display unit 160R for displaying a right scene, a left-right pair of mat switches 180l, 180R provided at the position where the rider rides on and get off the dummy bicycle 120, and a main control unit 200 for total control of the bicycle simulation system 100*a*. The front monitor 140 has a loudspeaker 210, and a general-use monitor can be used therefore. It is recommendable to dispose the front monitor 140, for example, at an upper face of the main control unit 200.

Hereinafter, as to a left-right pair of mechanisms in the bicycle simulation system, "L" will be attached to the reference numeral for the left one, and "R" will be attached to the reference numeral for the right one, for distinct description of them. In addition, the visual point of the rider riding on the dummy bicycle 120 is referred to the eye point EP1, and the visual point of the rider when the rider has got off the dummy bicycle 120 and has moved to the front side relative to a steering handle 280 will be referred to as the eye point EP2.

First, the dummy bicycle 120 will be described. The dummy bicycle 120 has a frame 220, a saddle 240 connected to the frame 220 through a seat pillar, the steering handle 280 turnable about a head tube of the frame 220, two front forks 300 as a stand for fixingly supporting the head tube 220*a*, and a rear wheel 320 rotatably supported by a rear end portion of the frame 220. A pipe 340 extending in a horizontal direction is provided at the tip ends of the front forks 300, and the pipe 340 is grounded on a floor. The rear wheel 320 serves as a rear stand. In addition, the dummy bicycle 120 has a pair of cranks 38 connected to the left and the right of a crankshaft, pedals 400 provided at the tip ends of the cranks 380, a front sprocket 420 provided at the right crank 380, a rear sprocket 460 rotationally driven by the front sprocket 420 through a chain 440, an iron-made flywheel 480 rotationally driven by the rear sprocket 460 through a one-way clutch, a drum brake 500 for braking the flywheel 480, and a brake lever 520 provided on the steering handle 280.

Further, the dummy bicycle 120 has a first speed pickup 540 for detecting the rotating speed of the flywheel 480, a second speed pickup 560 for detecting the rotating speed of the crankshaft, a steering angle sensor 580 for detecting the steering angle of the steering handle 280, and a rotation sensor 600 for detecting the amount of operation of the brake lever 520 through a brake wire. The brake wire is branched in the course thereof, one of the branches is connected to the rotation sensor 600, while the other is connected to the drum brake 500; when the brake lever 520 is operated, the amount of operation is detected by the rotation sensor 600, and the flywheel 480 is braked by the drum brake 500. A controller 620 is provided on the front forks 300. Besides, the grounding of the driver's foot or feet can be detected by a mat switch 180L, 180R.

Figure 12:
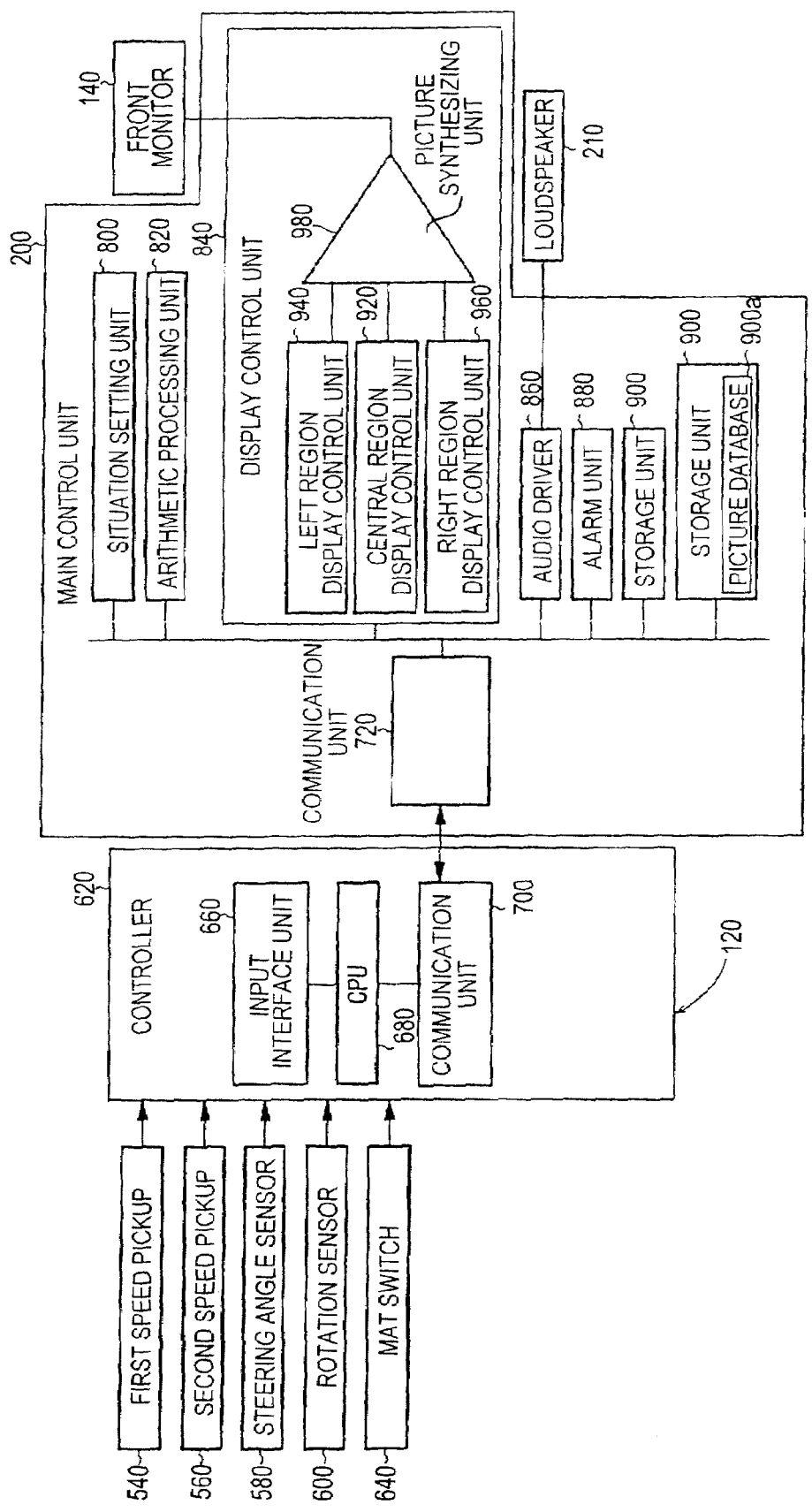
FIG. 12 is a general block diagram of the bicycle simulation system according to the second embodiment.

As shown in FIG. 12, the controller 620 has an input interface unit 660, a CPU (Central Processing Unit) 680, and a first communication unit 700. The first communication unit 700 is connected a second communication unit 720 in the main control unit 200, for real-time communication with the main control unit 200. The first speed pickup 540, the second speed pickup 560, the steering angle sensor 580, the rotation sensor 600 and the mat switch 180L, 180R are connected to the controller 620 through the input interface unit 660, for inputting signals. The CPU 680 processes or converts the signals from the electrical component elements, and transmits the processed or converted signals to the main control unit 200 through the first communication unit 700.

The main control unit 200 has a situation setting unit 800 for setting the situation of simulated cycling, an arithmetic processing unit 820 for executing arithmetic processes according to the running conditions, a display control unit 840 for controlling the display on the front monitor 140, an audio driver 860 for audio output from a loudspeaker 210, an alarm unit for issuing a predetermined alarm to the rider, and a storage unit 90 capable of reading and writing of data.

In the arithmetic processing unit 820, for example, a simulated running velocity V is determined based on the signal obtained from the first speed pickup 540 through the controller 620, a simulated running direction is determined based on the signal from the steering angle sensor 580, and the current position on a simulation basis is set. The storage unit 900 is provided with a picture database 900a in which a picture of the scene corresponding to the current position obtained by the arithmetic processing unit 820 or polygon data for constituting the picture and the like are recorded.

In the alarm unit 880, for example, it is judged whether or not the rider's operation is appropriate, based on the signals obtained from the second speed pickup 560, the rotation sensor 600 and the mat switch 180L,180R and issues a predetermined alarm when the operation is inappropriate. The alarm is displayed as characters on the screen 140a of the front monitor 140, or issued as a voice from the loudspeaker 210.

The display control unit 840 has a central region display control unit 920, a left region display control unit 940, a right region display control unit 960, and a picture synthesizing unit 980. The central region display control unit 920 has the function to display a picture in a wide central display region 1000 exclusive of narrow regions at the left and right ends on the screen 140a of the front monitor 140 (see FIG. 11), and sets and displays a front-side scene at the current position obtained by the arithmetic processing unit 820, based on the picture database 900a. The left region display control unit 940 has the function to display a picture in a left end display region 1020L set at a roughly central height portion in a narrow region at the left end on the screen 140a, and sets and displays a left-direction scene at the current position, based on the picture database 900a. Similarly, the right region display control unit 960 has the function to display a picture in a right end display region 1020R set at the right end symmetrical with the left end display region 1020L, and sets and displays a right-direction scene at the current position, based on the picture database 900a. Incidentally, the central display region 1000, the left end display region 1020L and the right end display region 1020R are different pictures on a conceptual basis, but they are displayed on the same screen 140a, so that they are displayed in the state of being synthesized into a single picture by the picture synthesizing unit 980. The pictures displayed in the central display region 1000, the left end display region 1020L and the right end display region 1020R are set on the basis of not only the current position but also the simulated situation set by the situation setting unit 800; for example, there are displayed pictures in which the ON/OFF conditions of traffic signals, the running conditions of other vehicles, the walking conditions of pedestrians, etc. are reflected in colors and motions as images of the traffic signals, the vehicles, the pedestrians, etc.

Figure 13:
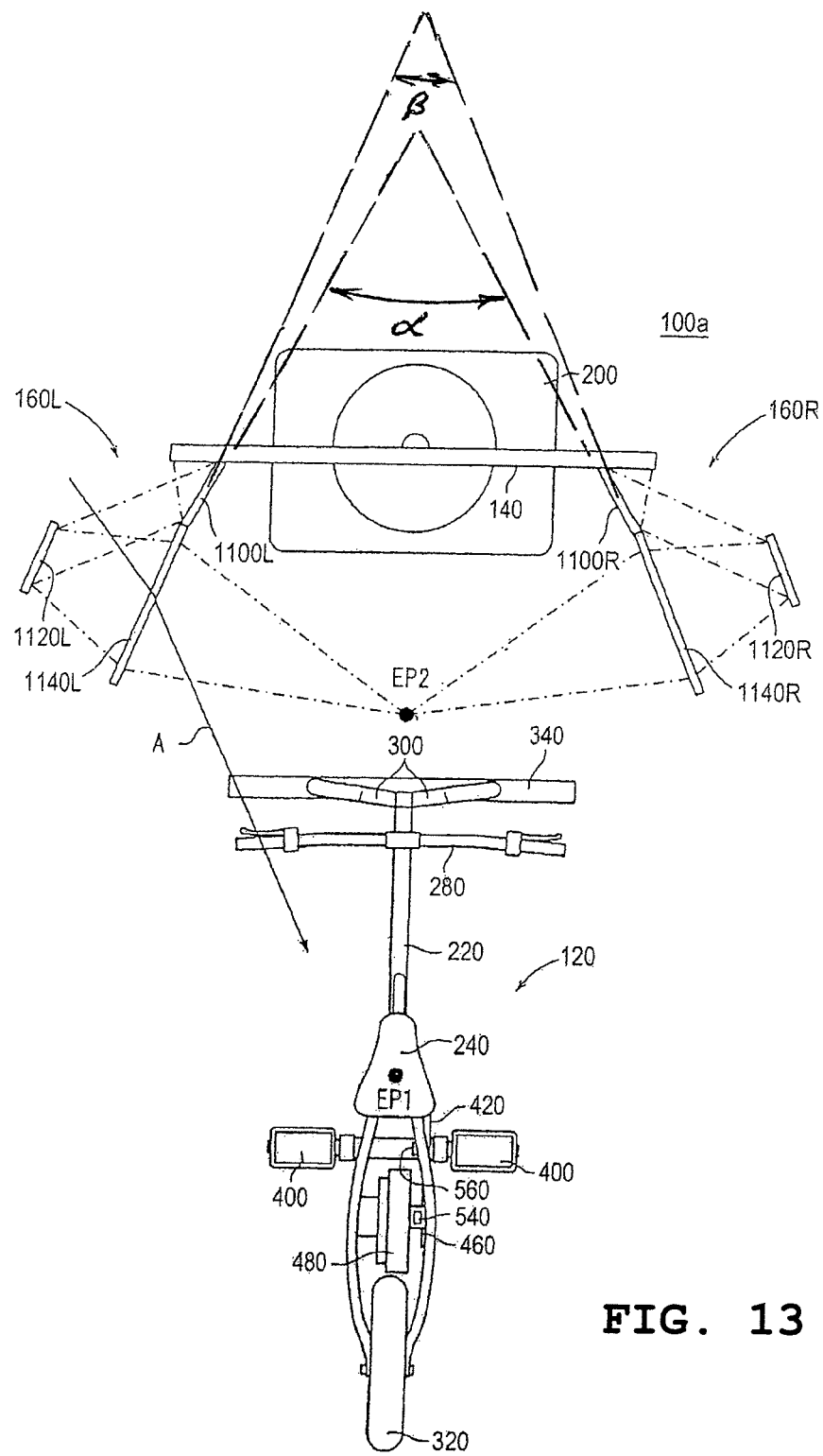
FIG. 13 is a plan view of the bicycle simulation system according to the second embodiment.

As shown in FIGS. 11 and 13, the left side display unit 160L has a first mirror member 1100L for reflecting to the left side a picture displayed in the left end display region 1020L, a second mirror member 1120L for reflecting further toward the center the image reflected by the first mirror member 1100L, and a magnifying lens 1140L for magnifying the picture originally present in the left end display region 1020L and reflected in the second mirror member 1120L. The first mirror member 1100L is provided skewly in top plan view so that its one end substantially make contact with a boundary portion between the left end display region 1020L and the central display region 1000 of the screen 140a, and covers the left end display region 1020L so that the latter is not seen to the rider. The second mirror member 1120L is located at a lateral and a little rear side of the front monitor 140, at the same height as the left end display region 1020L, and is set skewly in top plan view. The second mirror members 1120L, 1120R are smaller than the first mirror members 1100L, 1100R so that only a central portion of the images reflected by the first mirror members 1100L, 1100R reaches the second mirror members 1120L, 1120R. Therefore only the central portion of the images reflected by the first mirror members 1100L, 1100R is visible from a second visual point EP2.

The magnifying lens 1140L is a Fresnel lens, which has sawtooth-like prisms at a minute pitch and is formed in a thin tetragonal flat plate-like shape. The magnifying lens 1140L is formed of an acrylic resin or the like, and is light and rigid. In addition, the magnifying lens 1140L is located between the second mirror member 1120L and the eye point EP2, is directed toward the eye point EP2, and is so set as to display the second mirror member 1120L in the state of being magnified substantially to the whole area thereof, as viewed from the eye point EP2. As can be seen in FIG. 13, the first mirror members 1100L, 1100R are oriented at an acute angle α relative to each other, and the magnifying lenses 1140L, 1100R are oriented at an acute angle 11 relative to each other, where the acute angle a is greater that the acute angle β.

Incidentally, as is clear from FIG. 12, the magnifying lens 1140L is visually confirmed to be skew (diagonal) from the eye point EP1, and is distant from the eye point EP1; therefore, the image displayed cannot be sufficiently recognized by the rider. Further, as indicated by an optical path A, the image displayed to the eye point EP1 is an image reflecting a position different from the second mirror member 1120L, and the picture in the left end display region 1020L is invisible as viewed from the eye point EP1.

On the other hand, as for the reflective surface of the second mirror member 1120L, the left end display region 1020L can not be visually recognized as viewed from the eye point EP1. In other words, the second mirror member 1120L is hidden by the magnifying lens 1140L as viewed from the eye point EP1, and, even if the second mirror member 1120L is not hidden by the magnifying lens 1140L, the portion different from the left end display region 1020L would be reflected in the second mirror member 1120L. Even if a part of the picture in the left end display region 1020L is reflected in the second mirror member 1120L as viewed from the eye point EP1, the reflected picture is distant from the eye point EP1, is skew and is small, so that the picture can substantially not be visually recognized.

The right side display unit 160R has a first mirror member 1100R for reflecting to the right side a picture displayed in the right end display region 1020R, a second mirror member 1120R for reflecting further toward the center the image reflected by the first mirror member 1100R, and a magnifying lens 1140R for magnifying the picture originally present in the right side display region 1020R and reflected in the second mirror member 1120R. The right side display unit 160R is left-right symmetrical with the left side display unit 160L, and shows the same action as that of the left side display unit 160L.

Now, a method of simulating a cycling by use of the bicycle simulation system 100a configured as above will be described below.

In the bicycle simulation system 100a, when the rider approaches the dummy bicycle 120 and treads on the mat switch 18)L, 180R to turn the switch ON, simulation is started, the characters "A simulated cycling is going to start. Please seat yourself on the saddle and work the pedals." are displayed on the screen 140a, or a voice of the same words is issued from the loudspeaker 210 (hereinafter referred to as output). The simulation includes such modes as a running mode, a foot grounding mode, a walking mode, a recession mode, etc., and a simulation according to the individual situations is executed.

The running mode is a mode in which the rider seated on the saddle 240 works the pedals 400 and manipulates the steering handle 280 to perform a simulated running. In this case, a scene varied based on a simulated running velocity V and a steering angle obtained based on the first speed pickup 540 and the steering angle sensor 580 is displayed in the central display region 1000 on the screen 140a. In the foot grounding mode, the rider operates the brake lever 520 to lower the simulated running velocity V to 0, then gets off the dummy bicycle 120, and treads on the mat switches 180L, 180R. As a result, a scene in which the rider and the bicycle are at rest in front of a red traffic signal is displayed in the central display region 1000 on the screen 140a.

The walking mode is a mode for walking while pushing the bicycle on a pedestrian exclusive-use road or the like, for example, a mode for leaning to walk while pushing the bicycle so as not to be an obstacle to other pedestrians or the like. In this case, the rider gets off the dummy bicycle 120, and stamps on the mat switches 180L, 180R, whereby a walking condition is reproduced, and a corresponding scene is displayed in the central display region 1000 on the screen 140a of the front monitor 140. The recession mode is a mode in which the rider having got off the bicycle recedes while pushing the bicycle. In this case, the rider gets off the dummy bicycle 120, and stamps on the mat switches 180L, 180R while operating a predetermined recession switch to turn it ON, whereby a receding condition is reproduced, and a corresponding scene is displayed in the central display region 1000 on the screen 140a of the front monitor 140. Incidentally, in each of these modes, a front-side scene is displayed in the central display region 1000, based on the current position determined by the arithmetic processing unit 820, and left and right scenes are displayed on the left side display unit 160L and the right side display unit 160R.

Figure 14:
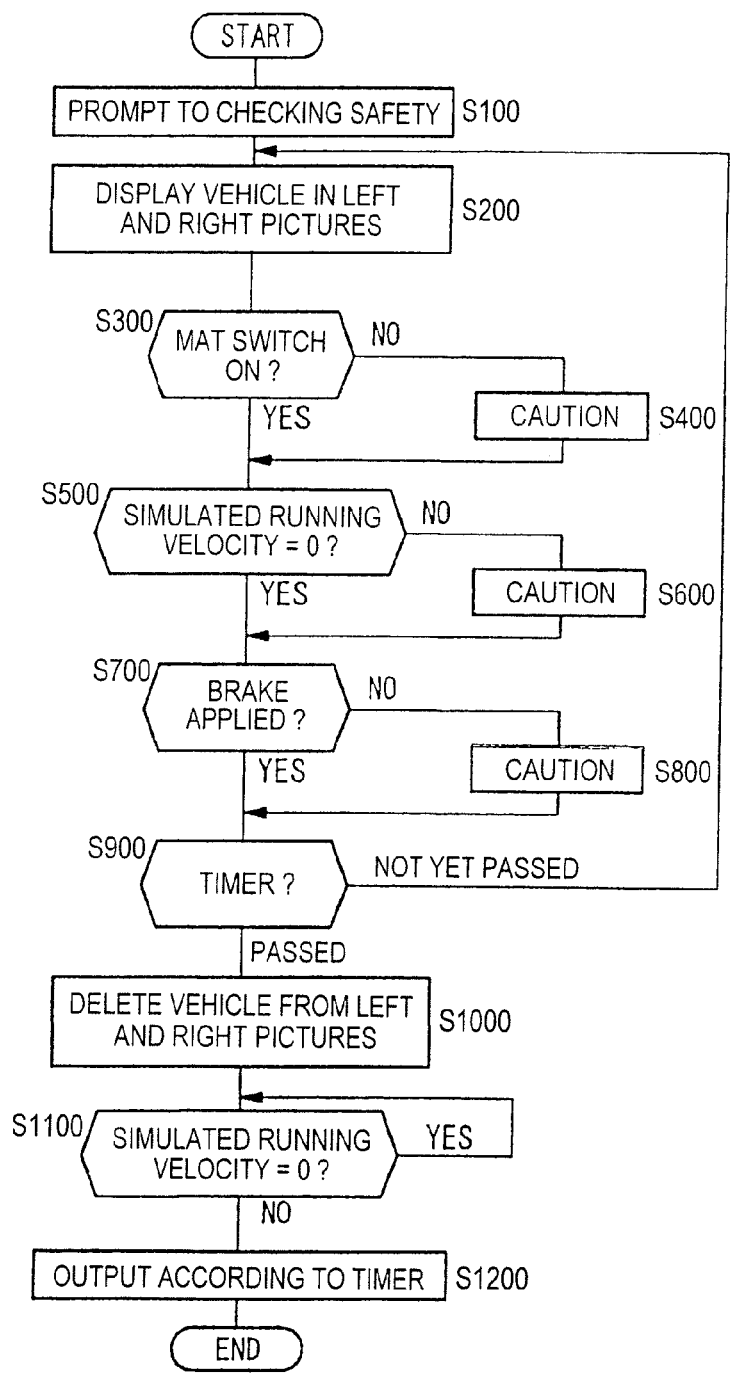
FIG. 14 is a flowchart showing the procedure of a left and right safety checking process.

Now, the left and right checking process conducted on a simulation basis will be described below referring to FIG. 14. The left and right checking process is a process carried out in the foot grounding mode, the walking mode and the like, and is a process for letting the rider to learn the action of confirming safety on the left and right sides. For example, in the case of a simulated situation of being at a crossing at which to strike a broad main street from a narrow array with "walls" on both sides, left-direction and right-direction pictures as viewed from a point slightly on the front side relative to the presumed current position (for example, on the front side by a distance corresponding to the interval between EP1 and EP2) may be displayed on the left side display unit 160L and the right side display unit 160R. In other words, it is recommendable to display not the pictures of the "walls" just besides the rider but the pictures showing the running conditions of vehicles in the leftward and rightward directions along the broad street as viewed from a point slightly on the front side.

First, instep S100, a guidance "Please check the left and right sides before starting to run." is outputted. The guidance may be omitted in the case of a high-grade rider, and the rider may be let check the left and right side voluntarily.

Here, the rider is demanded to check the left and right sides by use of the left side display unit 160L and the right side display unit 160R. The images displayed on the left side display unit 160L and the right side display unit 160R are invisible as viewed from the eye point EP1, and can be visually confirmed only after the rider gets off the saddle 240 and leans forward over the steering handle 280 to put his head to the position of the eye point EP2. Namely, the rider is demanded to act as if he leaned forward from a real narrow alley to check the left and right sides along the broad street, so that the rider can securely learn the left and right safety checking action.

In step S200, pictures of left and right background scenes plus a vehicle 2000 (see FIG. 11) are displayed on the left side display unit 160L and the right side display unit 160R. The vehicles 2000 displayed are assumed to be running; for example, it is recommendable to display a front image of the vehicle 2000 gradually becoming larger on the right side display unit 1000, then to display a side image of the vehicle 2000 passing from the right to the left on the central display region 1000, and further to display a rear image of the vehicle 2000 gradually becoming smaller on the left side display unit 160L. Such a display of the vehicle 2000 continued within a time counted by a timer process in step S900, and one or more vehicles 2000 are displayed.

In step S300, it is checked whether the mat switch 180L, 180R is ON or OFF, and step S400 is entered when the mat switch 180L, 180R is OFF, whereas step S500 is entered when the mat switch 180L, 180R is ON. In step S400, a caution "Please ground your foot or feet and check the left and right sides." is outputted, and step S500 is entered.

In step S500, it is checked whether or not the simulated running velocity V based on the signal from the first speed pickup 540 is 0. Step S600 is entered if V>0, and step S700 is entered if V=0. In step S600, a caution "The vehicle is still passing, so please don't go ahead." is outputted, and step S700 is entered. In this case, an output of a mimic Klaxon sound from the loudspeaker 210 enhances the effectiveness of the caution.

In step S700, the amount of operation of the brake lever 520 based on the signal from the rotation sensor 600 is examined, and step S800 is entered when a brake operation has not been made, whereas step S900 is entered when a brake operation has been done. In step S800, a caution "Please apply the brake to stop securely." is outputted, and step S900 is entered.

In step S900, the lapse of time in displaying the vehicle 2000 is examined by the timer, and the process returns to step S200 to continue the display of the vehicle 2000 if a prescribed time has not yet passed, whereas step S1000 is entered if the prescribed time has passed. The prescribed time may be varied appropriately by use of a random number or the like. In step S1000, the vehicle 2000 is deleted from the pictures displayed on the left side display unit 160L and the right side display unit 160R. In this instance, abrupt deletion of the vehicle 2000 being displayed is unnatural, and, therefore, it is recommendable to continue the display until the vehicle 2000 being displayed at that time runs far away and thereafter to stop the display of a new vehicle 2000.

In step S1100, it is checked whether or not the simulated running velocity V based on the signal from the first speed pickup 540 is 0. The control process stands by if V=0, and step S1200 is entered if V≠0.

In step S1200, the lapse of time from the time point of deletion of the vehicle 2000 from the pictures by the process of step S1000 is recognized by a predetermined timer, and an output according to the timer is outputted. Specifically, if the lapse of time is within a prescribed time, the characters "The check of safety on the left and right sides before running has been done rightly." are outputted, whereas if the lapse of time is more than the prescribed time, the characters "Are you checking the left and right sides? No vehicle is coming now." are outputted, to promote the rider to start running. After step S1200 is ended, the left and right safety checking process shown in FIG. 14 is ended, and another mode such as a running mode is entered. In such a left and right safety checking process, self-rating may be conducted according to predetermined rules based on the caution processes of steps S400, S600 and S800 and the like.

As has been described above, according to the bicycle simulation system 100a in the second embodiment, the left and right scenes are displayed in the left end display region 1020L and the right end display region 1020R on the screen 140a, so that the monitor 140 as the front display unit functions also as side display units, which promises a simple configuration, and it suffices for the display system to be composed of the single front monitor 140. Therefore, this system is particularly favorable for uses in which the system is conveyed or transported frequently. In addition, since reflection is conducted twice by the first mirror members 1100L, 100R and the second mirror members 1120L, 1120R, the positions and the directions in which the scenes are displayed can be set arbitrarily, and the images displayed are almost invisible as viewed from the eye point EP1 but can be visually confirmed as viewed from the eye point EP2 which is the position of the head of the rider leaning forward. Therefore, the rider can be let take the left and right safety checking action assuredly and let learn and get the habit of the safety checking action.

Further, since the images are magnified by use of the magnifying lenses 1140L and 1140R, it is possible to set small the second mirror members 1120L, 1120R, the left end display region 1020L and the right end display region 1020R. In addition, since a projection system such as a projector is not used for displaying pictures, the bicycle simulation system can be installed even in a narrow place.

Incidentally, in the above-described example, it has been assumed that the left side display unit 160L and the right side display unit 160R are so set that they can be visually confirmed when viewed from the eye point EP2 but are invisible when viewed from the eye point EP1. In the case of using the bicycle simulation system for other purposes than the left and right safety checking action (for example, use for a game in which the rider's getting off is not presumed), however, the side display units may be so set that they are visible when viewed from the eye point EP1.

Now, bicycle simulation systems 100b to 100d according to other embodiments will be described below. In the following description, the same configurations as those in the bicycle simulation system 100a will be denoted by the same symbols as used above, and detailed description thereof will be omitted.

Figure 15:
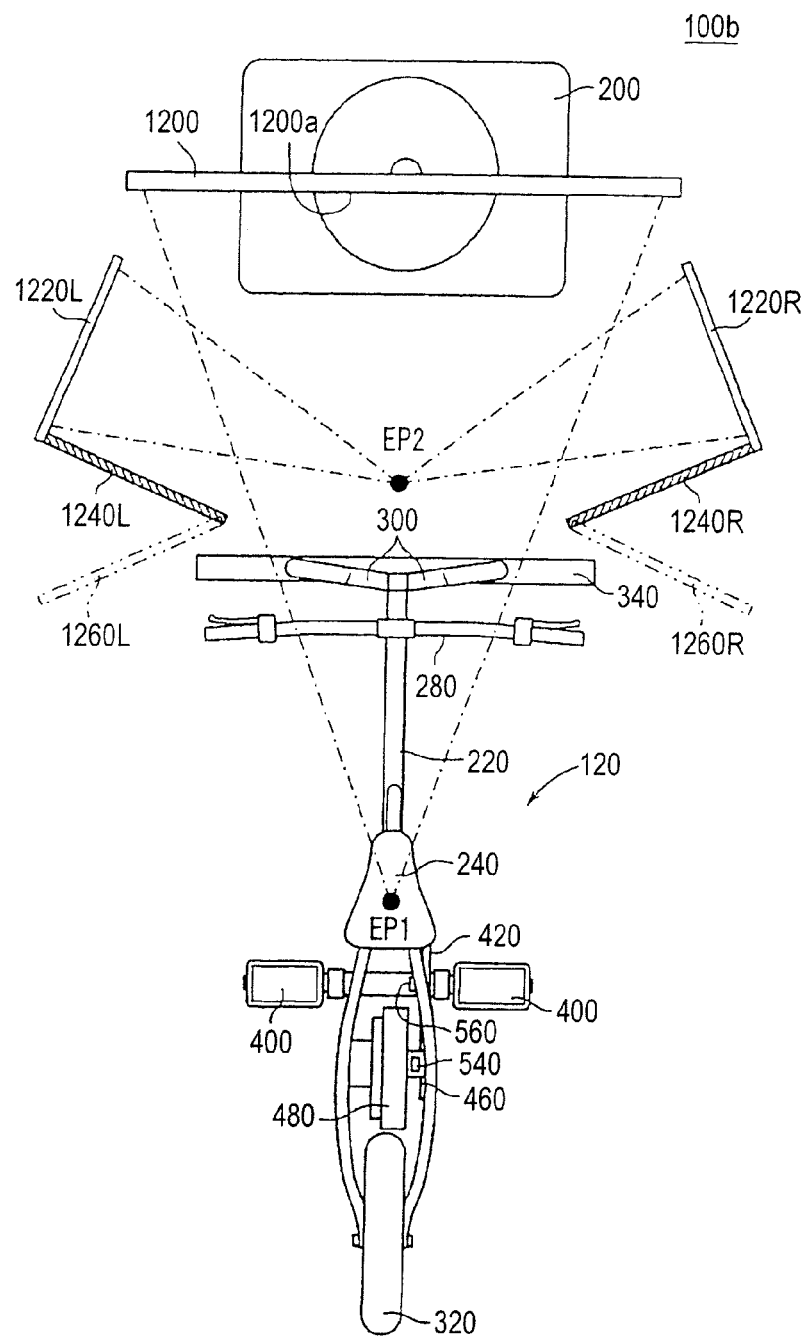
FIG. 15 is a plan view of a bicycle simulation system according to a third embodiment of the present invention.

As shown in FIG. 15, the bicycle simulation system 100b according to the third embodiment has a dummy bicycle 120, a main control unit 200, a front monitor 1200, a left monitor (side display unit) 1220L for displaying a left scene, and a right monitor (side display unit) 1220R for displaying a right scene. The front monitor 1200, the left monitor 1220L and the right monitor 1220R are independently configured, and are controlled by a display control unit 840 (see FIG. 12) in the main control unit 200 to display individual pictures. Specifically, the front monitor 1200 is controlled by a central region display control unit 920, the left monitor 1220L by a left region display control unit 940, and the right monitor 1220R by a right region display control unit 960. In addition, though the front monitor 1200 is the same as the above-mentioned front monitor 140 in configuration on a hardware basis, its screen 1200a lacks the left end display region 1020L and the right end display region 1020R, and a front scene is displayed on the whole area of the screen 1200a. Therefore, there is no need for the above-mentioned picture synthesizing unit 980 (see FIG. 12).

The front monitor 1200, like the above-mentioned front monitor 140, is disposed on the front side of the dummy bicycle 120. The left monitor 1220L is disposed at a position on the left and slightly rear side of the front monitor 1200, the right monitor 1220R is disposed at a position in left-right symmetry with the left monitor 1220L, and the left and right monitors are so set as to face toward the eye point EP2.

Figure 16:
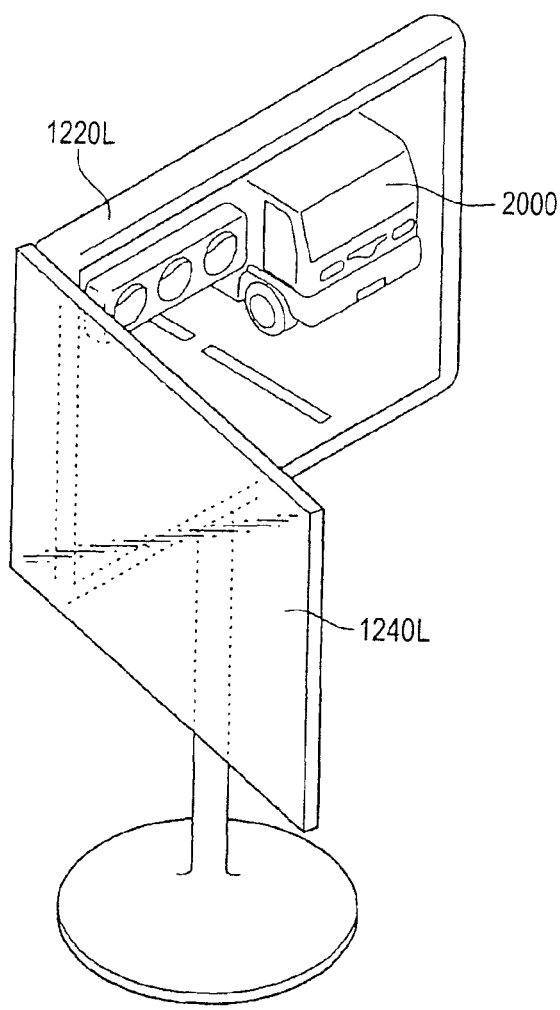
FIG. 16 is a perspective view of a left monitor.

As shown in FIGS. 15 and 16, the left monitor 1220L is provided with a shield plate (shielding means) 1240L projecting from the rear-side end face of the left monitor 1220L. The shield plate 1240L is set in a direction at about 90° against the screen of the left monitor 1220L in top plan view so that the whole surface of the screen is invisible when viewed from the eye point EP1. In addition, as apparent from FIG. 15, the length of the shield plate 1240L is so set that the whole surface of the front monitor 1200 can be visually confirmed when viewed from the eye point EP1.

Similarly, the right monitor 1220R is provided with a shield plate (shielding means) 1240R, and is so set as to shield the screen of the right monitor 1220R as viewed from the eye point EP1, and the length thereof is so set that the front monitor 1200 can be visually confirmed when viewed from the eye point EP1.

Thus, according to the bicycle simulation system 100b, the whole surface of the front monitor 1200 can be used for front display. In addition, the left monitor 1220L and the right monitor 1220R can be securely shielded as viewed from the eye point EP1, by use of the simple shielding plates 1240L and 1240R. Further, since a projection system such as a projector is not used for displaying pictures, the bicycle simulation system 100b can be installed even in a narrow place, and distortion of pictures would not be generated.

Incidentally, the shielding plates 1240L and 1240R are not limited to those configured to be integral with the left monitor 1220L and the right monitor 1220R, respectively, and it suffices for the shielding plates 1240L, 1240R to be provided between the monitors 1220L, 1220R and the eye point EP1. For example, as indicated by two-dotted chain lines 1260L and 1260R, the shielding plates may be provided at separate positions from the left monitor 1220L and the right monitor 1220R, with appropriate setting of their directions.

Figure 17:
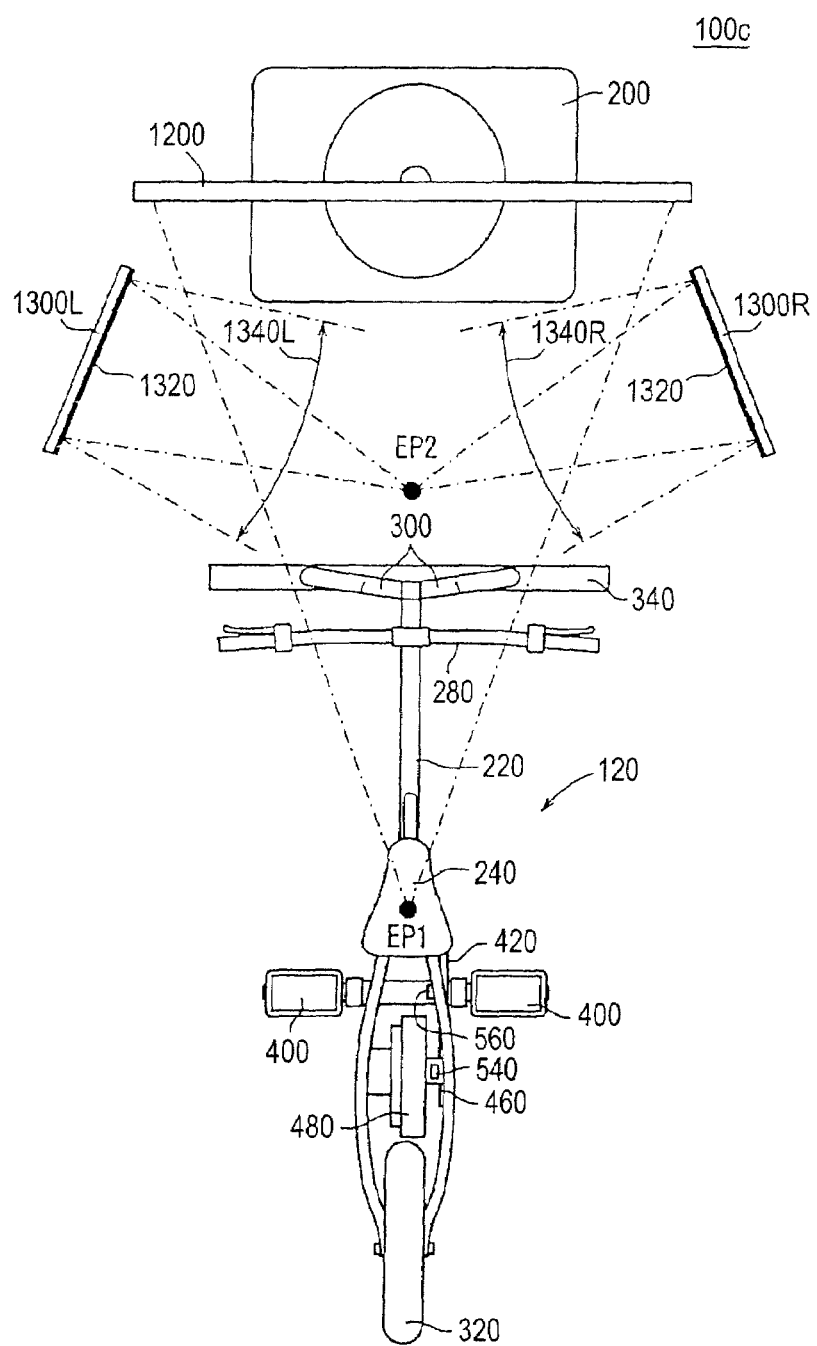
FIG. 17 is a plan view of a bicycle simulation system according to a fourth embodiment of the present invention.

Next, as shown in FIG. 17, a bicycle simulation system 100c according to a fourth embodiment has a dummy bicycle 120, a main control unit 200, a front monitor 1200, a left monitor (side display unit) for displaying a left scene, and a right monitor (side display unit) 1300R for displaying a right scene. The left monitor 1300L and the right monitor 1300R are the same as the above-mentioned left monitor 1220L and right monitor 1220R in configuration and layout, and light control films (shielding means) 1320 are adhered respectively to their screens. Besides, the above-mentioned shielding plates 1240L and 1240R are not provided. In other words, the bicycle simulation system 100d can be said to be a system obtained by replacing the shielding plates 1240L, 1240R in the bicycle simulation system 100b according to the second embodiment by the light control films 1320.

The light control film 1320 is the same kind of film as that adhered to a display screen of a cellular phone for an anti-peeping purpose and used for limiting the angle of visibility. By the angle-of-visibility limiting function of the light control films 1320, the visual fields of the screens of the left monitor 1300L and the right monitor 1300R are limited to ranges 1340L and 1340R, respectively, so that the screens of the left monitor 1300L and the right monitor 1300R are invisible when viewed from the eye point EP1 but can be visually recognized clearly when viewed from the eye point EP2.

Figure 18:
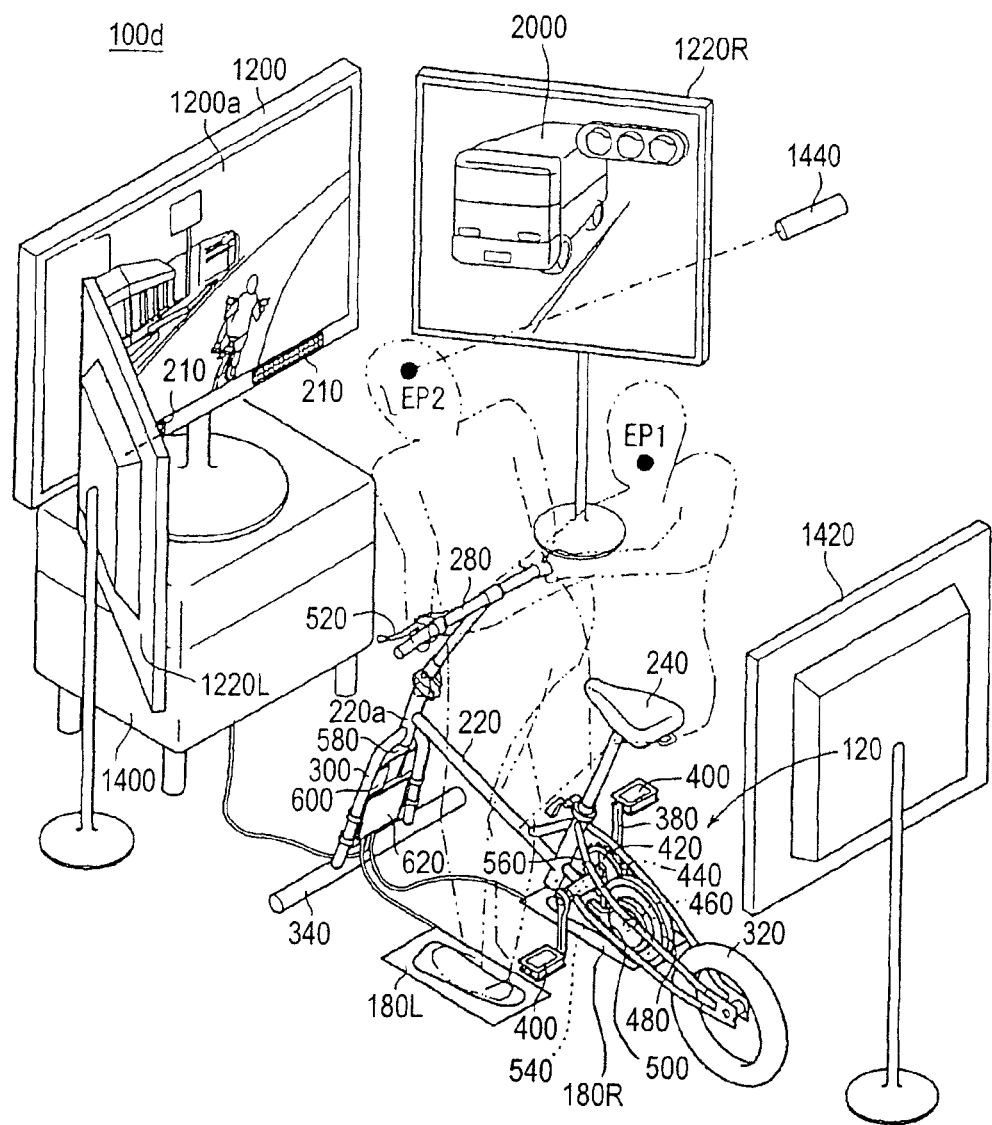
FIG. 18 is a perspective view of a bicycle simulation system according to a fifth embodiment of the present invention.

In the next place, as shown in FIG. 18, a bicycle simulation system 100d according to a fifth embodiment has a dummy bicycle 120, a main control unit 1400, a front monitor 1200, a left monitor 1220L for displaying a left scene, a right monitor 1220R for displaying a right scene, a rear monitor 1420 for displaying a rear scene, and a head tracking sensor (position detection means) 1440 for detecting the condition where the rider's head is located at an eye point EP2. The rear monitor 1420 is so disposed that it is located on the rear side of the dummy bicycle 120 and its screen faces forwards. Therefore, the rider can visually confirm the screen of the rear monitor 1420 by turning back. The rear monitor 1420 is controlled in its display by the main control unit 1400, together with the front monitor 1200, the left monitor 1220L and the rear monitor 1220R. As the head tracking sensor 1440, for example, a photoelectric type non-contact sensor can be used.

Figure 19:
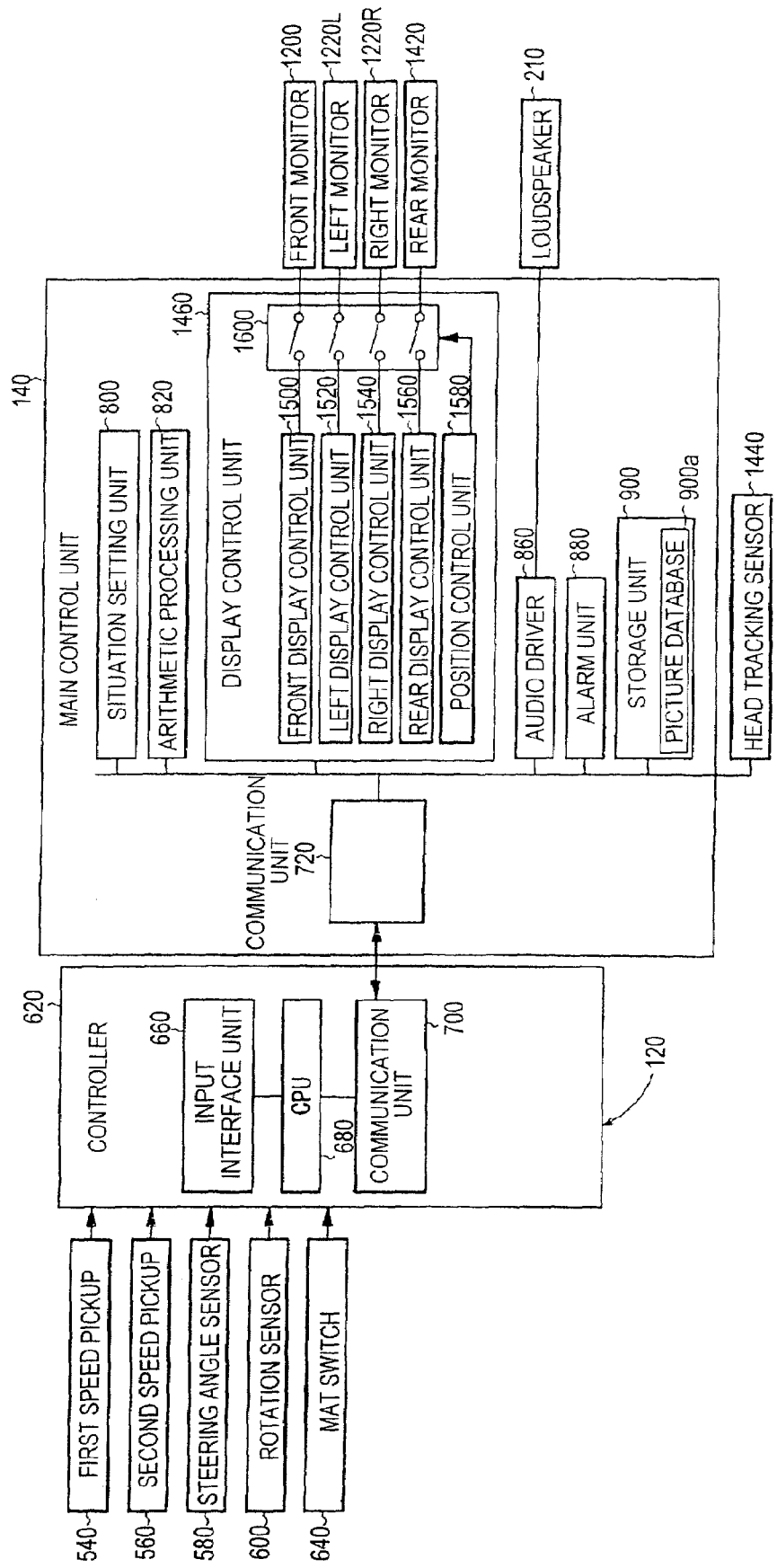
FIG. 19 is a general block diagram of the bicycle simulation system according to the fifth embodiment.

As shown in FIG. 19, the main control unit 1400 is the substantially the same as the above-mentioned main control unit 200 in configuration, and is provided with a display control unit 1460 corresponding to the above-mentioned display control unit 1840. In addition, the head tracking sensor 1440 is connected to the main control unit 1400, whereby the position of the rider's head can be detected.

The display control unit 1460 has a front display control unit 1500, a left display control unit 1520, a right display control unit 1540, the rear display control unit 1560, a position judging unit 1580, and a switcher (display switching means) 1600. The front display control unit 1500, the left display control unit 1520 and the right display control unit 1540 correspond respectively to the above-mentioned central region display control unit 920 (see FIG. 2), left region display control unit 940 and right region display control unit 960, and control the display on the front monitor 1200, the left monitor 1220L and the right monitor 1220R, respectively. Besides, the rear display control unit 1560 controls the display on the rear monitor 1420.

The switcher 1600 is inserted between the display control units 1500 to 1560 and the monitors, and permits or stops the supply of picture signals to the monitors under the action of the position judging unit 1580. Incidentally, while the switcher 1600 is conceptually represented as an assembly of switching elements in FIG. 19, it suffices practically for the switcher to control the supply and stop of the picture signals by display control drivers or the like.

The position judging unit 1580 operates the switcher 1600 based on a signal supplied from the head tracking sensor 1440. Specifically, when the rider is present in a normal seated position and his head is located at the eye point EP1, the head tracking sensor 1440 supplies an OFF signal to the position judging unit 1580, whereon the position judging unit 1580 controls the switcher 1600 so as to supply picture signals to the front monitor 1200 and the rear monitor 1420, thereby displaying pictures on these monitors, and to stop the supply of picture signals to the left monitor 1220L and the right monitor 1220R, thereby switching from picture display to non-display on these monitors.

In addition, when the rider leans forward and his head is located at the eye point EP2, the head tracking sensor 1440 supplies an ON signal to the position judging unit 1580, whereon the position judging unit 1580 controls the switcher 1600 so as to supply picture signals to the left monitor 1220L and the right monitor 1220R, thereby displaying pictures on these monitors, and to stop the supply of picture signals to the front monitor 1200 and the rear monitor 1420, thereby achieving a non-display state or a still picture display state of holding the immediately preceding pictures on these monitors. As a result of this, during normal operation, the front monitor 1200 and the rear monitor 1420 can be visually confirmed as viewed from the eye point EP1, whereas the pictures on the left monitor 1220L and the right monitor 1220R are invisible as viewed from the eye point EP1. In addition, in a left and right safety checking process (see FIG. 4), the left monitor 1220L and the right monitor 1220R can be visually confirmed as viewed from the eye point EP2, whereby the rider can securely learn a safety checking action. Further, the number of the monitors displaying pictures is always two, and, for the other monitors which are in the non-display state or the still picture display state, the picture generating process is unnecessary, so that the amount of data arithmetically processed is reduced.

Incidentally, as for the means of switching from picture display to non-display, it suffices to switch to non-display in regard of motion pictures; for example, the pictures displayed last may be held as still pictures. With the still pictures thus displayed continually, the sense of incompatibility at the time of switching can be alleviated, whereby realism is enhanced. The setting as to whether the non-display, the still picture display or the motion picture display on the front monitor 1200 and the rear monitor 1420 is to be continued or not may be made by taking into account the functions of the switcher 1600 and the number of output ports thereof.

Furthermore, as shown in FIG. 20, a direction sensor (direction detecting means) 1620 for detecting the direction of the rider's head (face) may be provided. The direction sensor 1620 detects the direction of the rider's head, based on an identification member 1660 provided in or on a helmet 1640 that the rider is wearing, and supplies a detection signal to the main control unit 1400. In the main control unit 1400 and the display control unit 1460, the displaying operation is controlled based on the signal obtained from the direction sensor 1620. Specifically, when the rider is judged to be looking forward, the front monitor 1200 is put into a displaying state; when the rider is judged to be looking leftward or rightward, the left monitor 1220L or the right monitor 1220R is made to be effective according to the rider's looking direction; and when the rider is judged to be looking rearward, the rear monitor 1420 is put into a displaying state.

This ensures that the monitors are selectively put into the displaying state according to the direction of the rider's head, and when the checking of the left and right sides is necessary, the rider can be securely let take a safety checking action by turning his head into the direction for checking. In addition, by putting into the non-display state the monitors on the sides to which the rider's head is not facing, it is possible to contrive a reduction in the amount of picture data arithmetically processed.

Furthermore, a more realistic scene can be obtained as follows. For example, when the rider's head is directed to the left front side, pictures are displayed on the front monitor 1200 and the left monitor 1220L, whereas the right monitor 1220R and the rear monitor 1420 are kept in a non-display state. Thus, pictures may be displayed on two monitors when the rider's head is directed to a skew intermediate portion.

The vehicle simulation system according to the present invention is not limited to the above-described embodiments, and a variety of configurations can naturally be adopted without departing from the gist of the invention. For example, the vehicle simulation system is applicable to a motorcycle simulation system and a four-wheel vehicle simulation system. Where the vehicle simulation system of the present invention is applied to a four-wheel vehicle simulation system, the system is suitable for training of striking a road from a garage with bad visibility. Besides, the use of the vehicle simulation system is not limited to traffic safety education and training but includes such uses as games, physical training, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle simulation system comprising:
a dummy vehicle operated by a driver;
a front display unit for displaying a scene based on the operation of said dummy vehicle and visually confirmed when viewed from a first visual point (EP1) set based on a seated position of said driver; and
a side display unit provided on a left side and a right side and configured so that an image displayed thereon is not visually confirmed when viewed from said first visual point (EP1), but is visually confirmed when viewed from a second visual point (EP2) on a front side relative to said first visual point (EP1),
wherein said front display unit has a single screen with a central display region for displaying a front scene, and left and right display regions on left and right sides of the central display region for displaying left and right scenes, and
further comprising:
first mirror members for shielding said left and right end display regions of the front display unit from said first visual point (EP1) and reflecting images toward a lateral side; and second mirror members for reflecting the images reflected by said first mirror members toward said second visual point (EP2),
wherein the first mirror members and the front display unit have substantially the same height, and the first mirror members are arranged so as to abut the front display unit along vertical lines between the central display region and the left and right display regions, thereby preventing the left and right display regions from being seen from each of the first and second visual points (EP1, EP2), and magnifying lenses provided between said second visual point and second mirror members.

2. The vehicle simulation system as set forth in claim 1, wherein the left and right display regions are contiguous with the central display region.

3. The vehicle simulation system as set forth in claim 1, wherein the second mirror members are smaller than the first mirror members so that only a central portion of the images reflected by the first mirror members reaches the second mirror members, and
therefore only the central portion of the images reflected by the first mirror members is visible from the second visual point (EP2).

4. A vehicle simulation system, comprising:
a dummy vehicle operated by a driver;
a front display unit for displaying a scene based on the operation of said dummy vehicle and visually confirmed when viewed from a first visual point (EP1) set based on a seated position of said driver., and
a side display unit provided on a left side and a right side and configured so that an image displayed thereon is not visually confirmed when viewed from said first visual point (EP1), but is visually confirmed when viewed from a second visual point (EP2) on a front side relative to said first visual point (EP1),
wherein said front display unit has a single screen with a central display region for displaying a front scene, and left and right display regions on left and right sides of the central display region for displaying left and right scenes,
further comprising:
first mirror members for shielding said left and right end display regions of the front display unit from said first visual point (EP1) and reflecting images toward a lateral side;
second mirror members for reflecting the images reflected by said first mirror members toward said second visual point (EP2); and
a magnifying lens provided between said second visual point (EP2) and each of the second mirror members,
wherein the second mirror members are smaller than the first mirror members so that only a central portion of the images reflected by the first mirror members reaches the second mirror members, and
therefore only a central portion of the images reflected by the first mirror members is visible from the second visual point (EP2).

5. The vehicle simulation system as set forth in claim 4, wherein the first mirror members and the front display unit have substantially the same height, and
the first mirror members are arranged so as to abut the front display unit along vertical lines between the central display region and the left and right display regions, thereby preventing the left and right display regions from being seen from each of the first and second visual points (EP1, EP2).

6. The vehicle simulation system as set forth in claim 4, wherein the magnifying lenses have surface areas larger than the second mirror members, and are arranged adjacent to outer vertical edges of the first mirror members.

7. A vehicle simulation system, comprising:
a dummy vehicle operated by a driver;
a front display unit for displaying a scene based on the operation of said dummy vehicle and visually confirmed when viewed from a first visual point (EP1) set based on a seated position of said driver; and
a side display unit provided on a left side and a right side and configured so that an image displayed thereon is not visually confirmed when viewed from said first visual point (EP1), but is visually confirmed when viewed from a second visual point (EP2) on a front side relative to said first visual point (EP1), wherein said front display unit has a single screen with a central display region for displaying a front scene, and left and right display regions on left and right sides of the central display region for displaying left and right scenes, and further comprising first mirror members for shielding said left and right end display regions of the front display unit from said first visual point (EP1) and reflecting image toward a lateral side;

second mirror members for reflecting the images reflected by said first mirror members toward said second visual point (EP2), and magnifying lenses provided between said second visual point and second mirror members, wherein the first mirror members are oriented at an acute angle a relative to each other, and the magnifying lenses are oriented at an acute angle β relative to each other, wherein the acute angle a is greater that the acute angle β.

* * * * *